US010613195B2

(12) United States Patent
Kishigami

(10) Patent No.: US 10,613,195 B2
(45) Date of Patent: Apr. 7, 2020

(54) RADAR APPARATUS AND RADAR METHOD

(71) Applicant: Panasonic Corporation, Osaka (JP)

(72) Inventor: Takaaki Kishigami, Kanagawa (JP)

(73) Assignee: Panasonic Corporation, Osaka (JP)

(*) Notice: Subject to any disclaimer, the term of this patent is extended or adjusted under 35 U.S.C. 154(b) by 315 days.

(21) Appl. No.: 15/455,948

(22) Filed: Mar. 10, 2017

(65) Prior Publication Data
US 2017/0276769 A1 Sep. 28, 2017

(30) Foreign Application Priority Data

Mar. 25, 2016 (JP) ................................ 2016-061603

(51) Int. Cl.
G01S 7/282 (2006.01)
H04B 7/0413 (2017.01)
G01S 7/02 (2006.01)
G01S 13/42 (2006.01)

(52) U.S. Cl.
CPC ............ *G01S 7/282* (2013.01); *H04B 7/0413* (2013.01); *G01S 7/023* (2013.01); *G01S 13/42* (2013.01)

(58) Field of Classification Search
CPC .......... G01S 7/28; G01S 7/282; G01S 13/522; G01S 13/76; G01S 13/284; G01S 13/931; G01S 13/42; G01S 7/023; G01S 2013/0254; G01S 13/003; G01S 13/878; H04B 7/0413; H04W 28/06; H03M 3/47
See application file for complete search history.

(56) References Cited

U.S. PATENT DOCUMENTS 7,289,058 B2 * 10/2007 Shima ..................... G01S 7/034
342/117
2006/0197701 A1 9/2006 Heide et al.
2008/0303711 A1 12/2008 Matsuoka
2013/0342387 A1 * 12/2013 Zwick ................... G01S 13/325
342/202

(Continued)

FOREIGN PATENT DOCUMENTS

JP 2006-504963 A 2/2006
JP 2008-304417 A 12/2008

(Continued)

OTHER PUBLICATIONS

Notice of Reasons for Refusal in Japan dated Nov. 5, 2019 for the related Japanese Patent Application No. 2016-061603.

Primary Examiner — Olumide Ajibade Akonai
(74) Attorney, Agent, or Firm — Seed IP Law Group LLP

(57) ABSTRACT

A radar apparatus includes: a radar transmission signal generator, which in operation, outputs a plurality of radar signals; a switching controller, which in operation, switches among plurality of transmitting antennas in sequence in a determined order to every one radar signal transmission period; and a radio transmitter, which in operation, transmits one radar signal every one radar signal transmission period through a allocated transmitting antenna to which switching has been made. A plurality of transmission timings at which the allocated transmitting antennas to which switching have been made transmit each of the plurality of radar signals within a determined period have identical time differences from a reference timing within the determined period.

10 Claims, 10 Drawing Sheets

(56) References Cited

U.S. PATENT DOCUMENTS

| | | | | |
|---|---|---|---|---|
| 2014/0062763 A1* | 3/2014 | Kishigami | ............... | G01S 13/42 |
| | | | | 342/158 |
| 2014/0085127 A1* | 3/2014 | Kishigami | ............... | G01S 13/91 |
| | | | | 342/108 |
| 2014/0085128 A1* | 3/2014 | Kishigami | ............ | G01S 13/288 |
| | | | | 342/118 |
| 2014/0327567 A1 | 11/2014 | Kishigami et al. | | |
| 2015/0198700 A1* | 7/2015 | Morita | .................... | G01S 7/023 |
| | | | | 342/59 |
| 2015/0295628 A1* | 10/2015 | Rambach | .......... | H04W 72/0446 |
| | | | | 370/337 |
| 2017/0248692 A1* | 8/2017 | Zivkovic | ................. | G01S 7/352 |

FOREIGN PATENT DOCUMENTS

| | | |
|---|---|---|
| WO | 2013/080570 A1 | 6/2013 |
| WO | WO-2015197226 A1 * | 12/2015 |

\* cited by examiner

RADAR APPARATUS AND RADAR METHOD

BACKGROUND

1. Technical Field

The present disclosure relates to a radar apparatus and a radar method.

2. Description of the Related Art

In recent years, a radar apparatus has been under consideration which uses short-wavelength radar transmission signals including microwaves or millimeter waves that yield high resolution. Further, for improvement in outdoor safety, there has been a demand for the development of a radar apparatus (wide-angle radar apparatus) that detects objects (targets) including pedestrians, as well as vehicles, in a wide angular range.

For example, as a radar apparatus, a pulse radar apparatus has been known which repeatedly emits pulse waves. A signal received by a wide-angle pulse radar that detects a vehicle or a pedestrian in a wide angular range is a mixture of a plurality of reflected waves from a target (e.g. a vehicle) that is present at a short distance and from a target (e.g. a pedestrian) that is present at a long distance. This requires (1) a radar transmitter to be configured to transmit a pulse wave or a pulse-modulated wave having an autocorrelation characteristic that forms a low-range side lobe (such a characteristic being hereinafter referred to as "low-range side lobe characteristic") and requires (2) a radar receiver to be configured to have a wide reception dynamic range.

The following two configurations are possible as configurations of a wide-angle radar apparatus.

The first configuration employs transmitting radar waves by mechanically or electronically scanning narrow-angle directional beams (with beams width of approximately several degrees) of pulse waves or modulated waves, and receiving reflected waves by receiving narrow-angle directional beams. The first configuration requires much scanning for high resolution and, as such, is less capable of tracking a fast-moving target.

The second configuration employs a technique (direction of arrival (DOA) estimation) in which reflected waves are received by an array antenna including a plurality of antennas (antenna elements) and the angles of arrival of the reflected waves are estimated by a signal-processing algorithm based on a phase difference in reception due to intervals between antennas. The second configuration, which allows the angles of arrival to be estimated at a receiving branch in a case where scanning intervals between transmission beams at a transmitting branch are skipped, achieves a reduction in scanning time and, as such, is higher in tracking capability than the first configuration. Examples of direction-of-arrival estimation methods include a Fourier transform based on a matrix operation, a Capon method based on an inverse matrix operation, an LP (linear prediction) method based on an inverse matrix operation, MUSIC (Multiple Signal Classification) based on an eigenvalue operation, and ESPRIT (estimation of signal parameters via rotational invariance techniques) based on an eigenvalue operation.

Further, as a radar apparatus, a configuration (sometimes referred to as "MIMO radar") has been proposed which includes a plurality of antennas (array antenna) at a transmitting branch as well as at a receiving branch and performs beam scanning by signal processing with the transmitting and receiving array antennas.

The MIMO radar multiplexes signals by frequency division or code division and transmits the multiplexed signals through the plurality of transmitting antennas. The MIMO radar receives, through the plurality of receiving antennas, signals reflected by surrounding objects (targets), demultiplexes the multiplexed transmitted signals from the respective received signals, and receives the demultiplexed signals. This allows the MIMO radar to take out a propagation channel response that is indicated by the product of the number of transmitting antennas and the number of receiving antennas. Further, the MIMO radar makes it possible to, by placing the transmitting and receiving antennas at appropriate intervals, virtually expand antenna openings and improve angular resolution.

For example, Japanese Unexamined Patent Application Publication No. 2008-304417 discloses a MIMO radar (hereinafter referred to as "time-division multiplexing MIMO radar") based on time-division multiplexing by switching among transmitting antennas. The time-division multiplexing MIMO radar outputs transmit pulses while successively switching among the transmitting antennas, from which transmit pulses are sent out, with a predetermined period T. Moreover, the time-division multiplexing MIMO radar receives, through a plurality of receiving antennas, signals produced by transmit pulses being reflected by objects, performs correlation processing between the received signals and the transmit pulses, and then performs a spatial FFT (fast Fourier transform) operation (process of estimating the directions of arrival of the reflected waves).

However, the time-division multiplexing MIMO radar suffers from a phase difference due to the switching among the transmitting antennas. Therefore, prior to the spatial FFT operation, the time-division multiplexing MIMO radar needs to make phase corrections to the received signals in consideration of the timings of switching among the transmitting antennas.

SUMMARY

One non-limiting and exemplary embodiment facilitates providing a radar apparatus and a radar method that allow a time-division multiplexing MIMO radar to eliminate the need to make phase corrections in consideration of the timings of switching among transmitting antennas.

In one general aspect, the techniques disclosed here feature a radar apparatus including: a radar signal generator, which in operation, outputs a plurality of radar signals; a switching controller, which in operation, allocates each of a plurality of transmitting antennas an even number of times in sequence in a determined order to every one or more radar signal transmission periods within a determined period; and a radio transmitter, which in operation, transmits each of the plurality of radar signals every one of the radar signal transmission periods through the allocated transmitting antenna. In the radar apparatus of the present disclosure, one or more pairs of an even number of transmission start timings at which the allocated transmitting antennas transmit each of the plurality of radar signals within the determined period have identical time differences from a reference timing within the determined period.

The aspect of the present disclosure allows a time-division multiplexing MIMO radar to eliminate the need to make phase corrections in consideration of the timings of switching among transmitting antennas.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
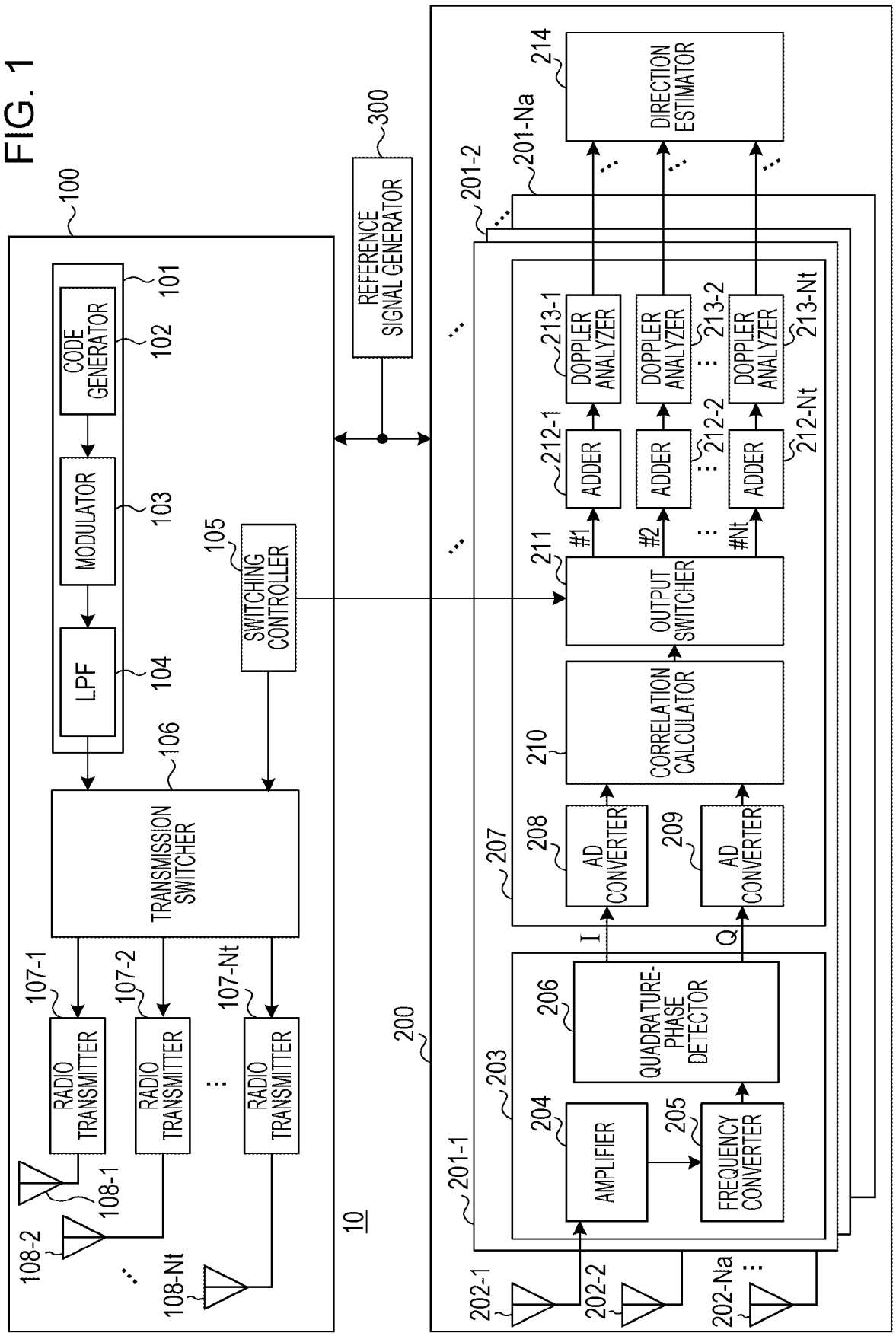
FIG. 1 shows an example of a configuration of a radar apparatus according to Embodiment 1 of the present disclosure.

In a case where a time-division multiplexing MIMO radar switches among its transmitting antennas every period $\Delta T$ and the frequency component of the reflected-wave signals of the radar transmission signals is f, the phases of reflected-wave signals of the radar transmission signals (transmit pulses) that are transmitted from each separate transmitting antenna vary by $2\pi f \Delta T$.

For this reason, in order to transmit transmit pulses at the same timing, the time-division multiplexing MIMO radar makes phase correction processing that gives a phase rotation of $-2\pi f \Delta T$ that is opposite to the phases included in the reflected-wave signals. The time-division multiplexing MIMO radar needs to perform this phase correction processing on all frequency bins.

For this reason, in a case where Nbin is the number of frequency bins, Nt is the number of transmitting antennas, and Na is the number of receiving antennas, the time-division multiplexing MIMO radar needs to perform complex multiplication (Nt−1)×(Na)×(Nbin) times during the phase correction processing. For example, in a case where the number of frequency bins Nbin is 512, the number of transmitting antennas Nt is 2, and the number of receiving antennas Na is 4, the time-division multiplexing MIMO radar needs to perform complex multiplication a total of 2048 times (=1×4×512).

Given these circumstances, an aspect of the present disclosure attempts to achieve a reduction in amount of calculation by eliminating the need for a time-division multiplexing MIMO radar to perform phase correction processing in consideration of the timings of switching among transmitting antennas.

An embodiment of the present disclosure is described in detail below with reference to the drawings. It should be noted that, in the embodiment below, the same constituent elements are given the same reference numerals, and duplication of description is omitted.

The following describes, as a radar apparatus, a configuration (i.e. a time-division multiplexing MIMO radar) in which a transmitting branch sends out different time-division multiplexed transmission signals through a plurality of transmitting antennas and a receiving branch demultiplexes each of the transmission signals and performs a receiving process.

Embodiment 1

Configuration of Radar Apparatus

FIG. 1 is a block diagram showing a configuration of a radar apparatus 10 according to Embodiment 1.

The radar apparatus 10 includes a radar transmitter (transmitting branch) 100, a radar receiver (receiving branch) 200, and a reference signal generator 300.

The radar transmitter 100 generates high-frequency (radio-frequency) radar signals (radar transmission signals) in accordance with reference signals inputted from the reference signal generator 300. Then, the radar transmitter 100 transmits the radar transmission signals with predetermined radar transmission periods through a transmitting array antenna including a plurality of transmitting antennas 108-1 to 108-Nt.

The radar receiver 200 receives, through a receiving array antenna including a plurality of receiving antennas 201-1 to 202-Na, reflected-wave signals produced by the radar transmission signals being reflected by a target (not illustrated). The radar receiver 200 performs synchronous processing with the radar transmitter 100 by performing the following processing operation with reference to the reference signals inputted from the reference signal generator 300. That is, the radar receiver 200 processes the reflected-wave signals received through each separate receiving antenna 202 and at least detects the presence or absence of a target and estimates the direction of the target. It should be noted that the target is an object to be detected by the radar apparatus 10 and examples of the target include vehicles (including four-wheel and two-wheel vehicles) or persons.

The reference signal generator 300 is connected to both the radar transmitter 100 and the radar receiver 200. The reference signal generator 300 supplies the reference signals to the radar transmitter 100 and the radar receiver 200 to synchronize processes in the radar transmitter 100 and the radar receiver 200.

Configuration of Radar Transmitter 100

The radar transmitter 100 includes a radar transmission signal generator 101, a switching controller 105, a transmission switcher 106, radio transmitters 107-1 to 107-Nt, and the transmitting antennas 108-1 to 108-Nt. That is, the radar transmitter 100 includes the Nt transmitting antennas 108, each of which is connected to the corresponding one of the radio transmitters 107.

The radar transmission signal generator 101 receives references signals from the reference signal generator 300, generates timing clocks by multiplying the reference signals by a predetermined number, and generates radar transmission signals in accordance with the timing clocks thus generated. Then, the radar transmission signal generator 101 repeatedly outputs the radar transmission signals with predetermined radar transmission periods (Tr). A radar transmission signal is represented by y(n, M)=I(n, M)+j Q(n, M). Note here that j denotes the imaginary unit, n denotes discrete time, and M denotes the ordinal number of a radar transmission period. Further, I(n, M) and Q(n, M) denote the in-phase component and quadrature component, respectively, of a radar transmission signal y(n, M) at discrete time n in the Mth radar transmission period.

The radar transmission signal generator 101 includes a code generator 102, a modulator 103, and an LPF (low-pass filter) 104.

Specifically, the code generator 102 generates a code $a_n(M)$ (n=1, . . . , L) (pulse code) of a code sequence of a code length L in the Mth radar transmission period. Used as the code $a_n(M)$ generated by the code generator 102 is a pulse code that gives a low-range side lobe characteristic. Examples of the code sequence include a Barker code, an M sequence code, and a Gold code.

The modulator 103 performs pulse modulation (amplitude modulation, ASK (amplitude shift keying), pulse shift keying) or phase modulation (phase shift keying) on the code $a_n(M)$ inputted from the code generator 102 and outputs a modulated signal to the LPF 104.

The LPF 104 outputs a signal component of the modulated signal inputted from the modulator 103 which is below a predetermined limited bandwidth to the transmission switcher 106 as a baseband radar transmission signal.

Figure 2:
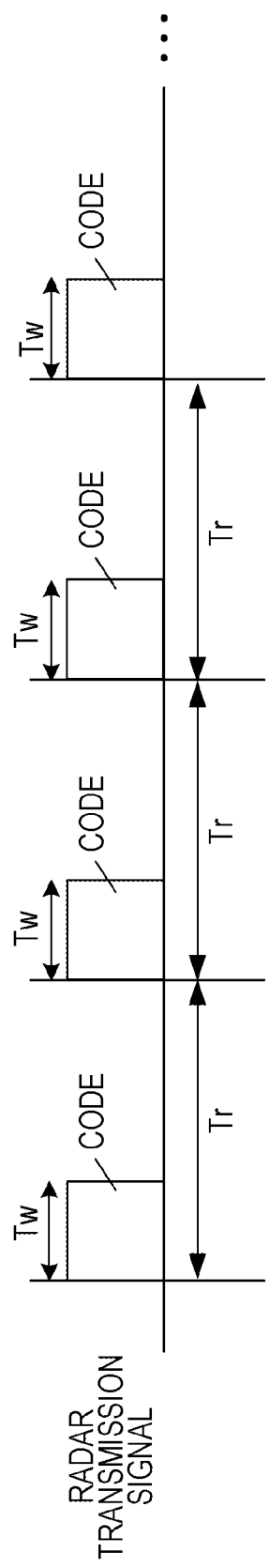
FIG. 2 shows examples of radar transmission signals according to Embodiment 1 of the present disclosure.

FIG. 2 shows radar transmission signals that are generated by the radar transmission signal generator 101. In each radar transmission period Tr, a code transmission section Tw includes a pulse code and the remaining section (Tr-Tw) is a no-signal section. One pulse code includes L subpulses, and each of the subpulses is subjected to pulse modulation with No samples, so that each code transmission section Tw includes Nr (=No×L) samples. That is, the modulator 103 has a sampling rate of (No×L)/Tw. Further, the no-signal section (Tr-Tw) includes Nu samples.

The switching controller 105 controls the switching operation of the transmission switcher 106 of the radar transmitter 100 and the switching operation of the output switcher 211 of the radar receiver 200. It should be noted that the control of the output switcher 211 of the radar receiver 200 by the switching controller 105 will be described later in the description of the operation of the radar receiver 200. The following describes the control of the transmission switcher 106 of the radar transmitter 100 by the switching controller 105.

The switching controller 105 switches among the plurality of transmitting antennas 108 to select a transmitting antenna 108 that is used for transmitting a radar transmission signal every radar transmission period Tr. The switching controller 105 outputs, to the transmission switcher 106, a control signal (hereinafter referred to as "switching control signal") for switching, every radar transmission period Tr, the transmitting antennas 108 (i.e. the radio transmitters 107) for transmitting a radar transmission signal.

The transmission switcher 106 selects one of the plurality of radio transmitters 107-1 to 107-Nt in accordance with the switching control signal. That is, the transmission switcher 106 assigns, to each of the radio transmitters 107-1 to 107-Nt, one of radar transmission periods Tr as a period in which to transmit a radar transmission signal. Instead, the transmission switcher 106 may assign each of the radio transmitters 107-1 to 107-Nt to one of radar transmission periods Tr as a period in which to transmit a radar transmission signal. Then, the transmission switcher 106 inputs, to the radio transmitter 107 thus selected, a radar transmission signal outputted from the radar transmission signal generator 101.

The radio transmitter 107 selected by the transmission switcher 106 transmits a radar transmission signal through the transmitting antenna 108 selected by the switching controller 105. That is, the radio transmitter 107 generates a radar transmission signal in a carrier-frequency (radio-frequency: RF) band by performing a frequency conversion on a baseband radar transmission signal outputted from the transmission switcher 106, amplifies the radar transmission signal thus generated to a predetermined transmission power P [dB], and outputs the radar transmission signal thus amplified to the transmitting antenna 108.

The transmitting antenna 108 emits, into a space, the radar transmission signal outputted from the radio transmitter 107.

Figure 3:
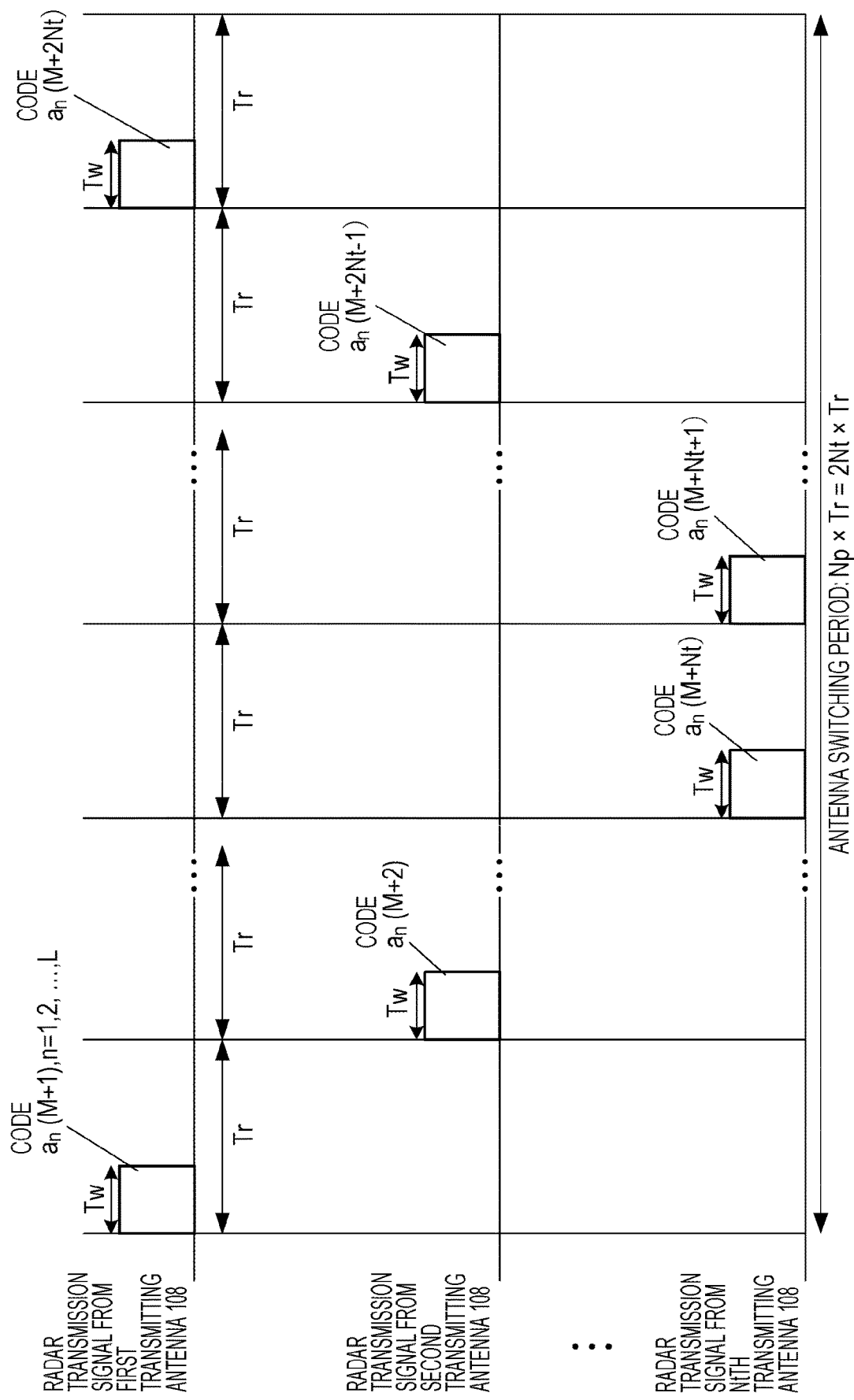
FIG. 3 shows an example of an operation of switching among transmitting antennas according to Embodiment 1 of the present disclosure.

FIG. 3 shows an example of an operation of switching among the transmitting antennas 108 according to Embodiment 1.

In FIG. 3, the switching controller 105 transmits, to the transmission switcher 106, a switching control signal indicating an instruction to switch from the first transmitting antenna 108 to the Ntth transmitting antenna 108 in order and then switches from the Ntth transmitting antenna 108 to the first transmitting antenna 108 in reverse order every radar transmission period Tr (first radar transmission period), i.e. to repeat antenna switching every antenna switching period (Np×Tr).

In accordance with the instruction indicated by the switching control signal, the transmission switcher 106 switches from the first radio transmitter 107 to the Ntth radio transmitter 107 in order and then switches from the Ntth radio transmitter 107 to the first radio transmitter 107 in order every radar transmission period Tr in an antenna switching period. This allows the radar transmitter 100 to transmit a radar transmission signal twice through each of the transmitting antennas 108 every antenna switching period (Np×Tr).

The switching controller 105 performs the control of repeating the operation of switching among the radio transmitters 107 with an antenna switching period (Np×Tr) (where Np is the predetermined number of times and Np=2 Nt).

Figure 4:
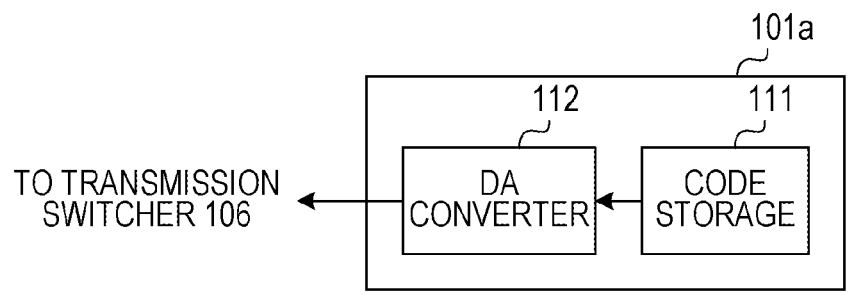
FIG. 4 shows another configuration of a radar transmission signal generator according to Embodiment 1 of the present disclosure.

It should be noted that the radar transmitter 100 may include a radar transmission signal generator 101a, which is shown in FIG. 4, instead of including the radar transmission signal generator 101. The radar transmission signal generator 101a includes a code storage 111 and a DA converter 112 instead of including the code generator 102, the modulator 103, or the LPF 104, which are shown in FIG. 1. The code storage 108 stores in advance code sequences generated by the code generator 102 (FIG. 1) and cyclically and sequentially reads out the code sequences thus stored. The DA converter 112 converts, into an analog signal, a code sequence (digital signal) outputted from the code storage 111.

Configuration of Radar Receiver 200

As shown in FIG. 1, the radar receiver 200 includes the Na receiving antennas 202, which constitute an array antenna. Further, the radar receiver 200 includes Na antenna system processors 201-1 to 201-Na and a direction estimator 214.

Each of the receiving antennas 202 receives a reflected-wave signal produced by a radar transmission signal being reflected by a target (object) and outputs the reflected-wave signal thus received to the corresponding one of the antenna system processors 201 as a received signal.

Each of the antenna system processors 201 includes a radio receiver 203 and a signal processor 207. Signals received by the Na receiving antennas 202 are inputted to the Na radio receivers 203, respectively. Further, output signals from the Na radio receivers 203 are inputted to the Na signal processors 207, respectively. The following describes processes in the zth (z=1, . . . Na) antenna system processor 201, which corresponds to the zth receiving antenna 202.

The radio receiver 203 includes an amplifier 204, a frequency converter 205, and a quadrature-phase detector 206. The radio receiver 203 receives reference signals from the reference signal generator 300, generates timing clocks by multiplying the reference signals by a predetermined number, and operates in accordance with the timing clocks thus generated. This allows the radar receiver 200 to ensure synchronization with radar transmission signals transmitted by the radar transmitter 100.

Specifically, the amplifier 204 amplifies a received signal inputted from the receiving antenna 202 to a predetermined level, the frequency converter 205 converts the frequency of the received signal from a high-frequency band into a baseband, and the quadrature-phase detector 206 converts the baseband received signal into a baseband received signal including an I signal and a Q signal.

The signal processor 207 includes AD converters 208 and 209, a correlation calculator 210, an output switcher 211, adders 212-1 to 212-Nt, and Doppler analyzers 213-1 to 213-Nt.

The signal processor 207 includes the Nt adders 212 and the Nt Doppler analyzers 213. Nt is equal to the number of systems that corresponds to the number of transmitting antennas 108.

The AD converter 208 receives the I signal from the quadrature-phase detector 206, and the AD converter 209 receives the Q signal from the quadrature-phase detector 206. The AD converter 208 takes discrete-time samples of the baseband signal including the I signal and thereby converts the I signal into digital data. The AD converter 209 takes discrete-time samples of the baseband signal including the Q signal and thereby converts the Q signal into digital data.

Note here that each of the AD converts 208 and 209 takes $N_s$ discrete samples for the duration Tp (=Tw/L) of each subpulse of a radar transmission signal. That is, the over-sampling number per subpulse is Ns.

In the following description, with use of an I signal $I_z(k, M)$ and a Q signal $Q_z(k, M)$, a baseband received signal that is outputted from the AD converters 208 and 209 at discrete time k in the Mth radar transmission period Tr[M] is expressed as a complex signal $x_z(k, M)=I_z(k, M)+j Q_z(k, M)$ (z=1, . . . , Na). Further, in the following, discrete time k has its basis (k=1) at the timing of the start of a radar transmission period (Tr), and the signal processor 207 periodically operates until a sample point k=(Nr+Nu)Ns/No preceding the end of the radar transmission period Tr. That is, k=1, . . . , (Nr+Nu)Ns/No. Note here that j is the imaginary unit.

For each radar transmission period Tr, the correlation calculator 210 performs a correlation calculation between a discrete sample value $x_z(k, M)$ including the discrete sample values $I_z(k, M)$ and $Q_z(k, M)$ inputted from the AD converters 209 and 209 and the pulse code $a(M)_n$ (where z=1, Na and n=1, . . . , L) transmitted by the radar transmitter 100. For example, the correlation calculator 210 performs a sliding correlation calculation between the discrete sample value $x_z(k, M)$ and the pulse code $a(M)_n$. For example, the correlation calculation value $AC_z(k, M)$ of a sliding correlation calculation at discrete time k in the Mth radar transmission period Tr[M] is calculated according to the following equation:

$$AC_z(k, M) = \sum_{n=1}^{L} x_z(k + N_s(n-1), M)a_n(M)^*  \quad (1)$$

where the asterisk (*) denotes a complex conjugate operator.

The correlation calculator 210 performs correlation calculations according to Eq. (1), for example, over the duration of k=1, . . . (Nr+Nu)Ns/No.

Figure 5:
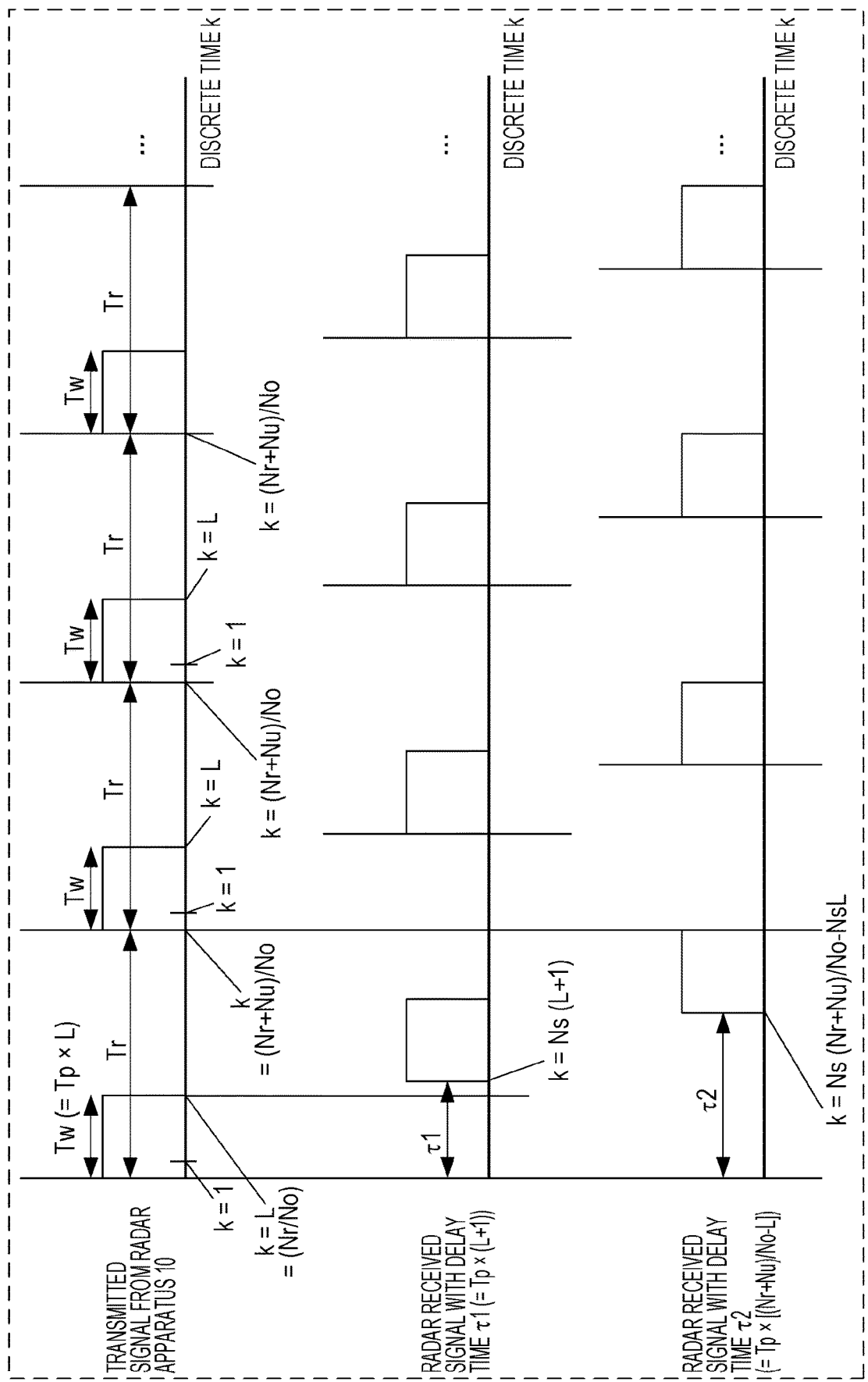
FIG. 5 shows examples of timings of transmission of radar transmission signals and examples of measuring ranges according to Embodiment 1 of the present disclosure.

It should be noted that the correlation calculator 210 is not limited to the case of performing correlation calculations over the duration of k=1, . . . , (Nr+Nu)Ns/No, but may limit a measuring range (i.e. the range of k) according to the range of presence of a target to be measured by the radar apparatus 10. This enables the radar apparatus 10 to reduce the amount of arithmetic processing that is performed by the correlation calculator 210. For example, the correlation calculator 210 may limit the measuring range to k=Ns(L+1), . . . (Nr+Nu) Ns/No−NsL. In this case, as shown in FIG. 5, the radar apparatus 10 does not perform measurements in time sections corresponding to transmission sections Tw.

With this, even in such a case where a radar transmission signal leaks directly into the radar receiver 200, the radar apparatus 10 can perform measurements such that the influence of the leak is excluded, as the correlation calculator 210 does not execute processing during a period in which the radar transmission signal leaks (i.e. a period of at least less than τ1). Further, in a case where the measuring range (range of k) is limited, the radar apparatus 10 may apply processing in a similarly limited measuring range (range of k) to processes in the adders 212, the Doppler analyzers 213, and the direction estimator 214, which will be described below. This makes it possible to reduce the amount of processing in each component, allowing the radar receiver 200 to reduce power consumption.

The output switcher 211 selects one of the Nt adders 212 in accordance with a switching control signal outputted from the switching controller 105 and outputs, to the adder 212 thus selected, an output produced by the correlation calculator 210 every radar transmission period Tr. Meanwhile, those adders 212 which were not selected by the output switcher 211 are brought into a no-signal state where the adders 212 receive no signals including signal components.

In the following, a switching control signal in the Mth radar transmission period Tr[M] is expressed as Nt bits [$bit_1(M), bit_2(M), \ldots, bit_{Nt}(M)$]. Note here that, in the Mth radar transmission period Tr[M], the output switcher 211 selects the $N_D$th adder 212 in a case where the $N_D$th bit $bit_{ND}(M)$ is 1 and does not select the $N_D$th adder 212 in a case where the $N_D$th bit $bit_{ND}(M)$ is 0. Note here that $N_D$=1, . . . , Nt. Also, note here that Np=2Nt.

For example, in a case where Nt=2, Np=4, and the Nt-bit switching control signal is given as:

[$bit_1(1), bit_2(1)$]=[1,0]
[$bit_1(2), bit_2(2)$]=[0,1]
[$bit_1(3), bit_2(3)$]=[0,1]
[$bit_1(4), bit_2(4)$]=[1,0]

Further, in a case where Nt=4, Np=8, and the Nt-bit switching control signal is given as:

[$bit_1(1), bit_2(1), bit_3(1), bit_4(1)$]=[1,0,0,0]
[$bit_1(2), bit_2(2), bit_3(2), bit_4(2)$]=[0,1,0,0]
[$bit_1(3), bit_2(3), bit_3(3), bit_4(3)$]=[0,0,1,0]

[bit$_1$(4), bit$_2$(4), bit$_3$(4), bit$_4$(4)]=[0,0,0,1]
[bit$_1$(5), bit$_2$(5), bit$_3$(5), bit$_4$(5)]=[0,0,0,1]
[bit$_1$(6), bit$_2$(6), bit$_3$(6), bit$_4$(6)]=[0,0,1,0]
[bit$_1$(7), bit$_2$(7), bit$_3$(7), bit$_4$(7)]=[0,1,0,0]
[bit$_1$(8), bit$_2$(8), bit$_3$(8), bit$_4$(8)]=[1,0,0,0]

In this way, the output switcher 211 switches among the Nt adders 212 every discrete time k in the Mth radar transmission period Tr to select an adder 212 that performs an addition process excluding addition of no-signal inputs from the output switcher 211. Further, the output switcher 211 selects each of the adders 212 twice in an antenna switching period (Np×Tr).

The Nt adders 212 perform addition (coherent integration) of correlation calculation values AC$_z$(k, M), which are outputted from the correlation calculator 210, over the duration (Tr×Np) of a predetermined number (Np) of radar transmission periods Tr, i.e. over an antenna switching period (Tr×Np), with use of the respective inputs provided from the output switcher 211 after the control of switching. The addition (coherent integration) process that the N$_D$th (N$_D$=1, ..., Nt) adder 212 performs as many times as the number of additions Np over an antenna switching period (Tr×Np) is expressed as:

$$CI_z^{(N_D)}(k, m) = \sum_{g=1}^{N_p} bit_{N_D}(g) AC_z(k, N_p(m-1)+g) \quad (2)$$

Note here that CI$_z^{ND}$(k, m) denotes the value of addition (hereinafter referred to as "correlation additional value") of correlation calculation values, Np is an integer of not less than 1, m is an integer of not less than 1 that indicates the ordinal number of an output from the adder 212 which increases by 1 every Np number of additions at the adder 212. That is, in a case where m=2, it means the second output of a correlation additional value from the adder 212. Note here that z=1, ..., Na and N$_D$=1, ..., Nt.

The N$_D$th adder 212 performs the process of adding those of the correlation calculation values outputted from the correlation calculator 210 which correspond to a radar transmission period Tr[M] during which bit$_{ND}$(M)=1. Specifically, in the example of an Nt-bit switching control signal [bit$_1$ (M), bit$_2$(M), ..., bit$_{Nt}$(M)], each of the adders 212 performs an addition process on outputs from the correlation calculator 210 twice, excluding addition of no-signal inputs from the output switcher 211 every antenna switching period. In this way, each of the Nt adders 212 adds correlation calculation values AC$_z$(k, Np(m−1)+1) to AC$_z$(k, Np×m) at uniform timings of discrete time k as correlation calculation values corresponding to a predetermined radar transmission period Tr and thereby calculates a correlation additional value CI$_z^{ND}$(k, m) every discrete time k.

It should be noted that, in order for an ideal gain of addition to be achieved, it is necessary that the phase components of correlation calculation values have a certain level of uniformity in as many sections of addition as the number of additions Np of correlation calculation values. That is, it is preferable that the number of additions Np be set according to an assumed maximum moving velocity of a target to be measured. A reason for this is that an increase in the assumed maximum velocity of the target leads to an increase in amount of variation in the Doppler frequencies of reflected waves from the target. For this reason, there is a reduction in duration of time for which the correlation is high. Therefore, the number of additions Np takes on a smaller value, with the result that the addition performed by the adders 212 brings about a smaller gain improvement effect.

Each of the Doppler analyzers 213 performs Doppler analyses on outputs from the corresponding one of the adders 212. Specifically, the Doppler analyzer 213 performs coherent integration at uniform timings of discrete time k with CI$_z^{(ND)}$(k, Nc(w−1)+1) to CI$_z^{(ND)}$(k, Nc×w), which are Nc outputs from the N$_D$th adder 212 obtained for each discrete time k, as results of addition corresponding to a predetermined radar transmission period Tr. For example, the Doppler analyzer 213 performs coherent integration after correcting a phase variation φ(fs)=2πfs(Tr×Np)Δφ depending on 2Nf different Doppler frequencies fsΔφ according to the following equation:

$$FT\_CI_z^{ND}(k, f_s, w) = \sum_{q=0}^{N_c-1} CI_z^{(N_D)}(k, N_c(w-1)+q+1)\exp[-j\phi(f_s)q]$$

$$= \sum_{q=0}^{N_c-1} CI_z^{(N_D)}(k, N_c(w-1)+q+1)\exp[-j2\pi f_s T_r N_p q \Delta\phi] \quad (3)$$

Note here that FT_CI$_z^{(ND)}$(k, fs, w) is the wth output from the N$_D$th Doppler analyzer 213 of the zth antenna system processor 201 and represents a result of coherent integration of Doppler frequencies fsΔφ at discrete time k with respect to outputs from the N$_D$th adder 212. Note, however, that N$_D$=1 to Nt, fs=−Nf+1, ..., 0, ..., Nf, k=1, ..., (Nr+Nu)Ns/No, w is an integer of not less than 1, and Δφ is the phase rotation unit.

This allows each of the antenna system processors 201 to yield FT_CI$_z^{ND}$(k, −Nf+1, w), ..., FT_CI$_z^{ND}$(k, Nf−1, w), which are results of coherent integration according to 2Nf Doppler frequency components for each discrete time k, for the duration (Tr×Np×Nc) of every Np×Nc radar transmission periods Tr. It should be noted that j is the imaginary unit and z=1, ..., Nt.

In a case where Δφ=1/Nc, the aforementioned process in the Doppler analyzer 213 is equivalent to performing a discrete Fourtier transform (DFT) operation on outputs from the adder 212 at a sampling frequency fm=1/Tm at sampling intervals Tm=(Tr×Np).

Further, setting Nf to a power-of-two number allows the Doppler analyzer 213 to apply a fast Fourier transform (FFT) operation and reduce the amount of arithmetic processing. It should be noted that when Nf>Nc, performing zero filling such that CI$_z^{(ND)}$(k, Nc(w−1)+q)=0 in a region where q>Nc makes it possible to similarly apply an FFT operation and reduce the amount of arithmetic processing.

Alternatively, instead of performing an FFT operation, the Doppler analyzer 213 may perform a process of serially performing product-sum operations according to Eq. (3) above. That is, in response to CI$_z^{(ND)}$(k, Nc(w−1)+q+1), which are Nc outputs from the adder 212 obtained for each discrete time k, the Doppler analyzer 213 may generate a coefficient exp[−j2πf$_s$ T$_r$N$_p$qΔφ] corresponding to fs=−Nf+1, ..., 0, ..., Nf−1 and serially perform product-sum operations. Note here that q=0 to Nc−1.

It should be noted that, in the following description, the wth outputs FT_CI$_1^{ND}$(k, fs, w), FT_CI$_2^{ND}$(k, fs, w), ..., FT_CI$_{Na}^{ND}$(k, fs, w) obtained by performing the same processes in the first to Nath antenna system processors 201 are denoted as a virtual receiving array correlation vector h(k, fs, w) in equation below. Note, however, that $N_D=1$ to N. The virtual receiving array correlation vector h(k, fs, w) includes as many elements as Nt×Na, which is the product of the number of transmitting antennas Nt and the number of receiving antennas Na. The virtual receiving array correlation vector h(k, fs, w) is used in the following description of a process of making a direction estimate based on a phase difference between receiving antennas 202 in response to reflected-wave signals from a target. Note here that $z=1, \ldots, Na$ and $N_D=1, \ldots, Nt$.

$$h(k, fs, w) = \begin{bmatrix} FT\_CI_1^{(1)}(k, fs, w) \\ FT\_CI_2^{(1)}(k, fs, w) \\ \vdots \\ FT\_CI_{Na}^{(1)}(k, fs, w) \\ FT\_CI_1^{(2)}(k, fs, w) \\ FT\_CI_2^{(2)}(k, fs, w) \\ \vdots \\ FT\_CI_{Na}^{(2)}(k, fs, w) \\ \vdots \\ FT\_CI_1^{(Nt)}(k, fs, w) \\ FT\_CI_2^{(Nt)}(k, fs, w) \\ \vdots \\ FT\_CI_{Na}^{(Nt)}(k, fs, w) \end{bmatrix} = \begin{bmatrix} h^1(k, fs, w) \\ h^2(k, fs, w) \\ \vdots \\ h^{Nt}(k, fs, w) \end{bmatrix} \quad (4)$$

$$h^{N_D}(k, fs, w) = \begin{bmatrix} FT\_CI_1^{(N_D)}(k, fs, w) \\ FT\_CI_2^{(N_D)}(k, fs, w) \\ \vdots \\ FT\_CI_{Na}^{(N_D)}(k, fs, w) \end{bmatrix} \quad (5)$$

The foregoing has described processes in the components of the signal processor 207.

The direction estimator 214 calculates a virtual receiving array correlation vector $h\_after\_cal$(k, fs, w) with corrections made to a phase deviation and an amplitude deviation between antenna system processors 201 with use of an array correction value $h\_cal_{[b]}$ for the wth virtual receiving array correlation vector h(k, fs, w) of the Doppler analyzers 213 outputted from the antenna system processors 201-1 to 201-Na. The virtual receiving array correlation vector $h\_after\_cal$(k, fs, w) is expressed by equation below. It should be noted that $b=1, \ldots, (Nt \times Na)$.

$$h\_after\_cal(k, fs, w) = CAh(k, fs, w) = \begin{bmatrix} h_1(k, fs, w) \\ h_2(k, fs, w) \\ \vdots \\ h_{Na \times Nr}(k, fs, w) \end{bmatrix} \quad (6)$$

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

The virtual receiving array correlation vector $h\_after\_cal$(k, fs, w) with corrections made to the inter-antenna deviations is a column vector composed of Na×Nr elements. In the following, the elements of the virtual receiving array correlation vector $h\_after\_cal$(k, fs, w) are denoted as $h_1$(k, fs, w), $\ldots, h_{Na \times Nr}$(k, fs, w) for use in the description of the direction estimation process.

The direction estimator 214 calculates a spatial profile with variations in azimuth direction θ in a direction estimation evaluation function value $P_H(\theta, k, fs, w)$ within a predetermined angular range, extracts a predetermined number of maximal peaks of the calculated spatial profile in descending order, and outputs the directions of elevation of the maximal peaks as direction-of-arrival estimate values.

It should be noted that the direction estimation evaluation function value $P_H(\theta, k, fs, w)$ can be obtained by various methods depending on direction-of-arrival estimation algorithms. For example, a usable example of a method for estimation with an array antenna is disclosed in Direction-of-arrival estimation using signal subspace modeling Cadzow, J. A.; *Aerospace and Electronic Systems*, IEEE Transactions on Volume: 28, Issue: 1 Publication Year: 1992, Page(s): 64-79.

For example, a beamformer method can be expressed by equations below. Other techniques such as Capon and MUSIC are similarly applicable.

$$P_H(\theta_u, k, fs, w) = |a_H(\theta_u)^H h_{VAH}(k, fs, w)|^2 \quad (7)$$

$$a_H(\theta_u) = \begin{bmatrix} 1 \\ \exp\{-j2\pi d_H \sin\theta_u/\lambda\} \\ \vdots \\ \exp\{-j2\pi(N_{VAH}-1)d_H \sin\theta_u/\lambda\} \end{bmatrix} \quad (8)$$

Note here that the superscript H is the Hermitian transposed operator. Further, $a_H(\theta_u)$ denotes the directional vector of a virtual receiving array with respect to an incoming wave in the azimuth direction $\theta_u$.

Further, the azimuth direction $\theta_u$ is a vector obtained by changing, by a predetermined azimuth interval $\beta_1$, an azimuth range within which a direction-of-arrival estimate is made. For example, $\theta_u$ is set as follows:

$\theta_u = \theta\min + u\beta_1, u=0, \ldots, NU$ $NU = \text{floor}[(\theta\max - \theta\min)/\beta_1] + 1$ where floor (x) is a function that returns the a maximum integer value that does not exceed the real number x.

Further, the aforementioned time information k may be converted into distance information to be outputted. The time information k may be converted into distance information R(k) according to equation below. Note here that Tw denotes the code transmission section, L denotes the pulse code length, and $C_0$ denotes the velocity of light.

$$R(k) = k\frac{T_w C_0}{2L} \quad (9)$$

Further, the Doppler frequency information (fsΔφ) may be converted into a relative velocity component to be outputted. The Doppler frequency fsΔφ can be converted into a relative velocity component $v_d$(fs) according to equation below. Note here that λ is the wavelength of the carrier frequency of an RF signal that is outputted from a radio transmitter 107.

$$v_d(f_s) = \frac{\lambda}{2} f_s \Delta\theta \quad (10)$$

As described above, the radar transmitter 100 switches among the transmitting antennas 108 every radar transmission period in accordance with a switching control signal (e.g. [bit$_1$(M), bit$_2$(M), ..., bit$_{Nt}$(M)]) to select a transmitting antenna 108 that transmits a radar transmission signal. As with FIG. 3, FIG. 6 shows an operation of switching among the transmitting antennas 108 (radio transmitters 107) according to Embodiment 1.

Specifically, the radar transmitter 100 switches from transmitting a radar transmission signal through the first transmitting antenna 108 to transmitting a radar transmission signal through the Ntth transmitting antenna 108 in order and then switches from transmitting a radar transmission signal through the Ntth transmitting antenna 108 to transmitting a radar transmission signal through the first transmitting antenna 108 in reverse order every radar transmission period Tr. That is, the radar transmitter 100 switches from transmitting a radar transmission signal through one transmitting antenna 108 to transmitting a radar transmission signal through another transmitting antenna 108 in a predetermined order every antenna switching period.

This causes a radar transmission signal to be transmitted twice from each of the transmitting antennas 108 every antenna switching period (Np×Tr). Further, the timings of transmission of two radar transmission signals that are transmitted from each of the transmitting antennas 108 within an antenna switching period (Np×Tr) are symmetrical with respect to a phase reference that is a timing of (Np−1)Tr/2. Note here that the phase reference (Np−1)Tr/2 is an intermediate timing between a timing of transmission (in FIG. 6, the first timing of transmission from the first transmitting antenna 108) within an antenna switching period (Np×Tr) at which the earliest radar transmission signal is transmitted from the plurality of transmitting antennas 108 and a timing of transmission (in FIG. 6, the second timing of transmission from the first transmitting antenna 108) within the antenna switching period (Np×Tr) at which the latest radar transmission signal is transmitted from the plurality of transmitting antennas 108.

Figure 6:
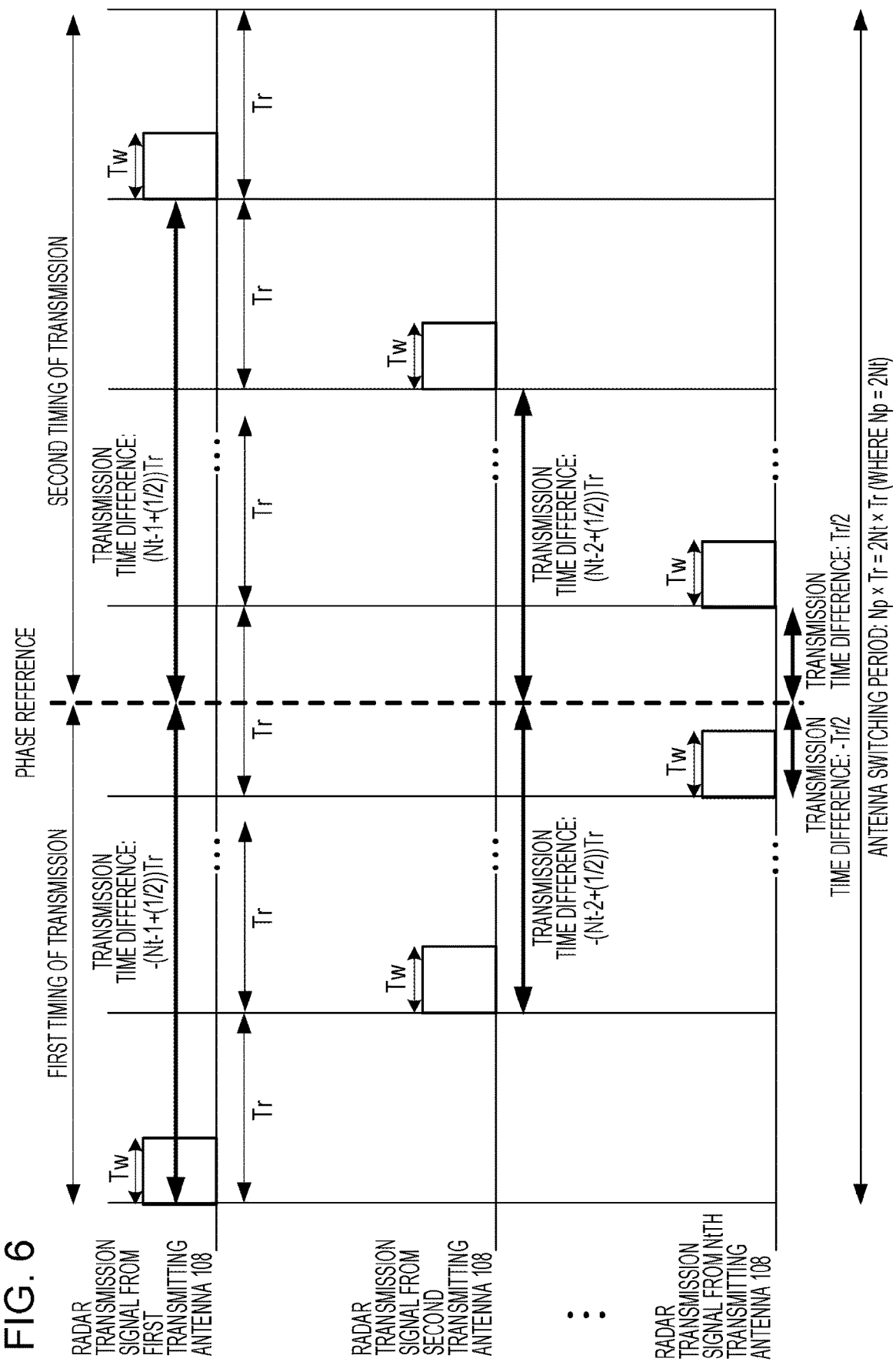
FIG. 6 shows an example of an operation of switching among transmitting antennas according to Embodiment 1 of the present disclosure.

For example, in FIG. 6, the first transmitting antenna 108 transmits transmission signals at timings one of which is −(Nt−1+(½))Tr away from the phase reference and the other of which is (Nt−1+(½))Tr away from the phase reference. Similarly, the second transmitting antenna 108 transmits transmission signals at timings one of which is −(Nt−2+(½))Tr away from the phase reference and the other of which is (Nt−2+(½))Tr away from the phase reference. Further, the Ntth transmitting antenna 108 transmits transmission signals at timings one of which is −Tr/2 away from the phase reference and the other of which is Tr/2 away from the phase reference. That is, the two timings of transmission from each of the transmitting antennas 108 are identical in time difference (transmission time difference) from the phase reference. That is, a pair of first and second transmission start timings have a relationship similar to that between a point in time that is later than a reference point in time and a point in time that is earlier than the reference point in time, and are the same time intervals as each other.

Figure 7:
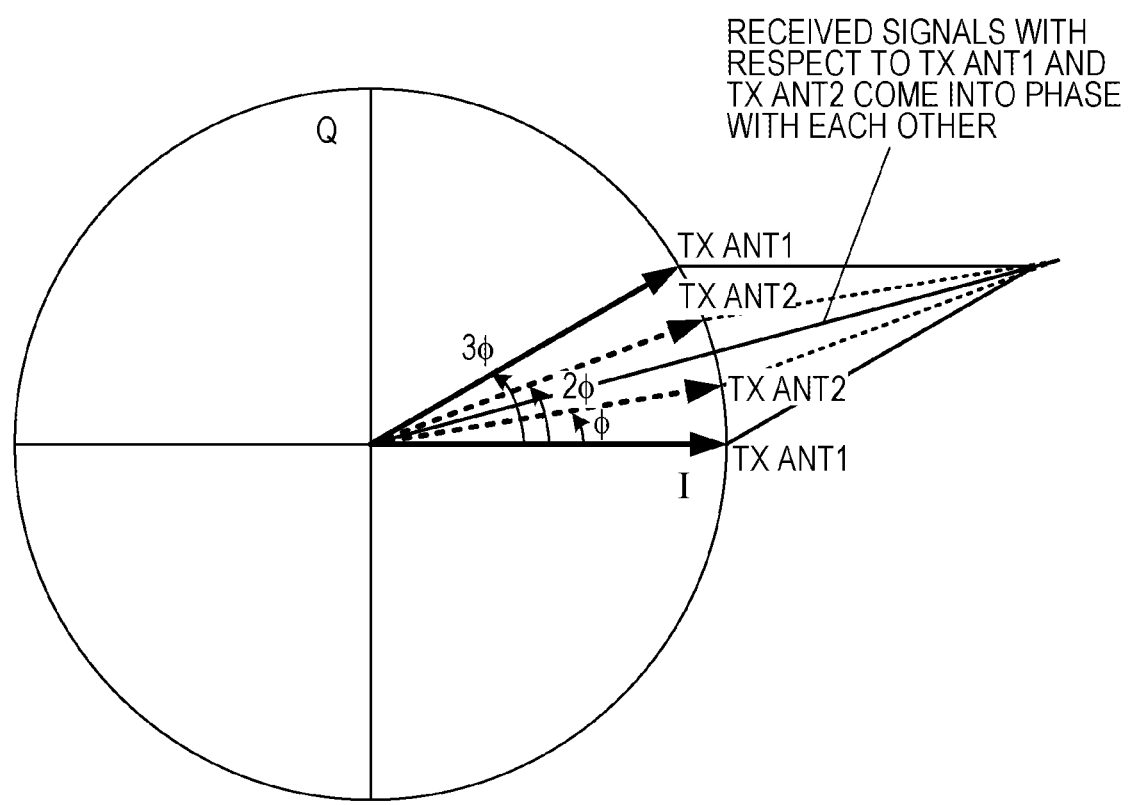
FIG. 7 shows changes in phase of received signals according to Embodiment 1 of the present disclosure.

The radar receiver 200 performs an addition process on correlation calculation values twice through each of the adders 212 for each separate transmitting antenna 108. FIG. 7 shows examples of changes in phase during an addition process in the radar receiver 200. It should be noted that, for simplicity of explanation, FIG. 7 shows two transmitting antennas TX ANT1 and TX ANT2 as examples of the plurality of transmitting antennas 108. The radar transmitter 100 switches in the order of TX ANT1, TX ANT2, TX ANT1, and then TX ANT2 and transmits radar transmission signals in this order.

In FIG. 7, due to the switching among the transmitting antennas 108, the phases of received signals (reflected-wave signals) that are received by the radar receiver 200 vary by a phase difference ϕ (=2πfdTr, where fd is the Doppler frequency-shift component of the reflected wave and Tr is the timing of switching among the transmitting antennas 108) every time the switching among the transmitting antennas 108 takes place.

The radar receiver 200 performs an addition process on correlation calculation values with respect to the radar transmission signals transmitted in the order of TX ANT1, TX ANT2, TX ANT1, and then TX ANT2. As shown in FIG. 7, a correlation additional value that the adder 212 corresponding to TX ANT1 obtained by adding two received signals of TX ANT1 and a correlation additional value that the adder 212 corresponding to TX ANT2 obtained by adding two received signals of TX ANT2 come into phase with each other at the phase reference and therefore become identical in phase to each other.

A reason for this is that, as mentioned above, the two timings of transmission at which a radar transmission signal is transmitted from each of the transmitting antennas 108 (TX ANT1 and TX ANT2) are symmetrical with respect to the phase reference. This allows the radar receiver 200 to, even if a reflected wave includes a Doppler frequency shift, perform an addition process to absorb a change in phase by the Doppler frequency shift due to differences in timing of switching among the transmitting antennas 108.

Therefore, in Embodiment 1, the radar receiver 200 does not need to perform a phase correction process on a phase difference that is generated due to the timings of switching among the transmission antennas 108, i.e. a phase correction process for transmitting transmit pulses at the same timing. Therefore, Embodiment 1 makes it unnecessary for the radar apparatus 10 (time-division multiplexing MIMO radar) to perform a phase correction process in consideration of the timings of switching among the transmitting antennas 108 and makes it possible for the radar apparatus 10 to reduce the amount of calculation.

It should be noted that, in Embodiment 1, the configuration of the radar apparatus 10 is not limited to the configuration shown in FIG. 1. For example, in a radar transmitter 10 shown in FIG. 8, a transmission switcher 106a selectively switches to any one of the transmitting antennas 108 so that a radar transmission signal from a radio transmitter 107a is transmitted through the transmitting antenna 108 thus selected. In this case, too, it is possible to bring about effects that are similar to those which are brought about by Embodiment 1.

Embodiment 2

A radar apparatus according to Embodiment 2 is described with continued reference to FIG. 1, as it has basic components in common with the radar apparatus 10 according to Embodiment 1.

Embodiment 1 has described a case where the switching controller 105 performs the switching control of switching among the transmitting antennas 108 every radar transmission period Tr. However, the switching controller 105 is not limited to this switching control and may perform the switching control of switching among the transmitting antennas 108 every plurality of radar transmission periods Tr.

Accordingly, Embodiment 2 describes the operation of the radar apparatus 10 in the case of switching among the transmitting antennas 108 every plurality of radar transmission periods Tr.

Figure 9:
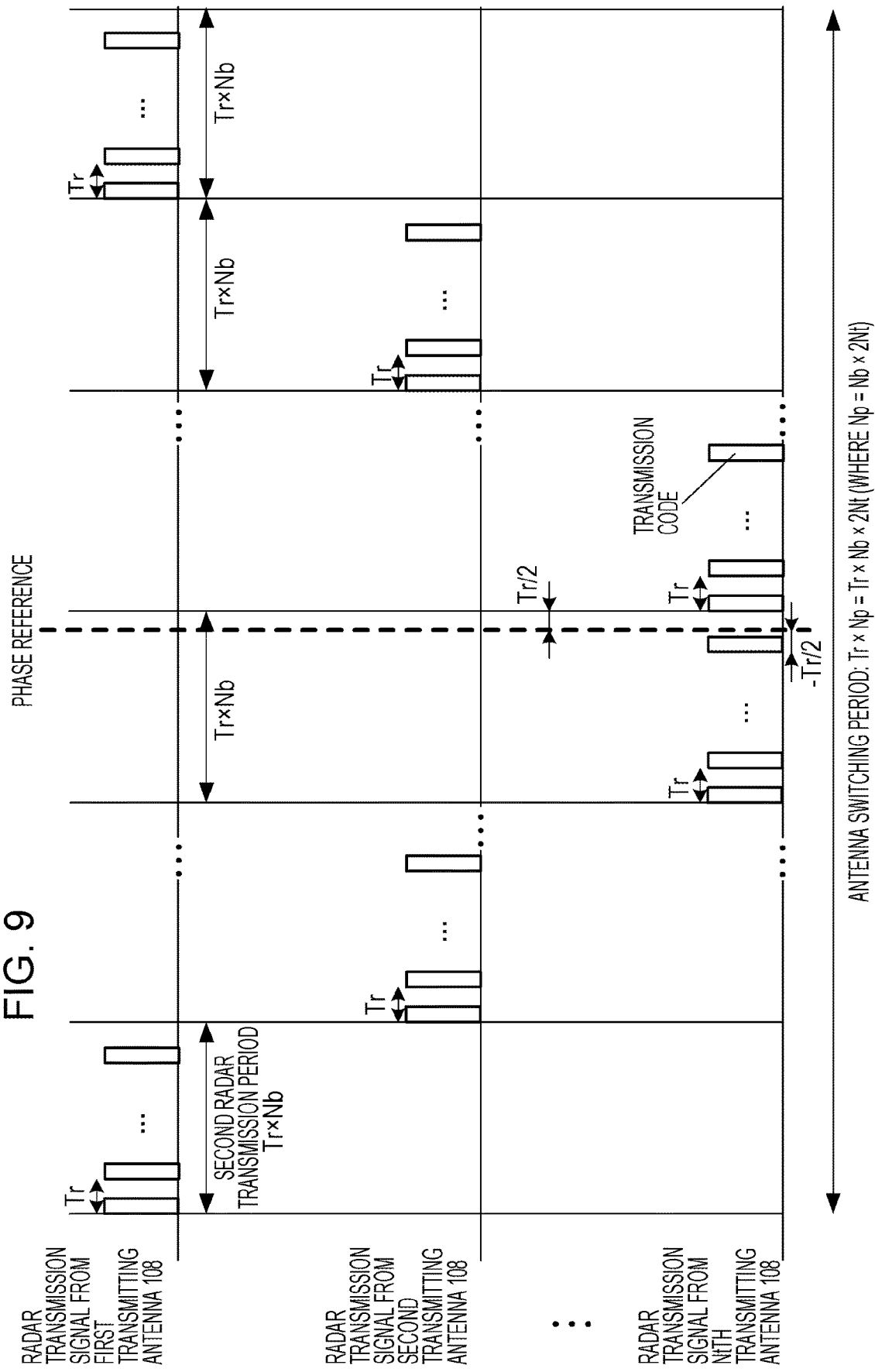
FIG. 9 shows an example of an operation of switching among transmitting antennas according to Embodiment 2 of the present disclosure.

FIG. 9 shows an example of an operation of switching among the transmitting antennas 108 according to Embodiment 2.

In FIG. 9, the switching controller 105 transmits, to the transmission switcher 106, a switching control signal indicating an instruction to switch from the first transmitting antenna 108 to the Ntth transmitting antenna 108 in order and then switches from the Ntth transmitting antenna 108 to the first transmitting antenna 108 in reverse order every Nb radar transmission periods Tr (i.e. a second radar transmission period (Tr×Nb)).

In accordance with the instruction indicated by the switching control signal, the transmission switcher 106 switches from the first radio transmitter 107 to the Ntth radio transmitter 107 in order and then switches from the Ntth radio transmitter 107 to the first radio transmitter 107 in order every second radar transmission period (Tr×Nb). This allows the radar transmitter 100 to transmit a radar transmission signal (Nb×2) times through each of the transmitting antennas 108 every antenna switching period (Np×Tr).

Further, the output switcher 211 of each of the antenna system processors 201 selects one of the Nt adders 212 in accordance with a switching control signal outputted from the switching controller 105 and outputs, to the adder 212 thus selected, an output produced by the correlation calculator 210 every Nb radar transmission periods Tr (second radar transmission period (Tr×Nb)). Meanwhile, those adders 212 which were not selected by the output switcher 211 are brought into a no-signal state where the adders 212 receive no signals including signal components.

In the following, a switching control signal in the Mth first radar transmission period Tr[M] is expressed as Nt bits [$bit_1(M)$, $bit_2(M)$, . . . , $bit_{Nt}(M)$]. M denotes the ordinal number of a radar transmission period.

Note here that, in the Mth first radar transmission period Tr[M], the output switcher 211 selects the $N_D$th adder 212 in a case where the $N_D$th bit $bit_{ND}(M)$ is 1 and does not select the $N_D$th adder 212 in a case where the $N_D$th bit $bit_{ND}(M)$ is 0. Note here that $N_D$=1, . . . , Nt. Also, note here that Np=Nb×2Nt.

For example, in a case where Nt=2 and Nb=2, Np=8, and the Nt-bit switching control signal is given as:

[$bit_1(1)$, $bit_2(1)$]=[1,0]
[$bit_1(2)$, $bit_2(2)$]=[1,0]
[$bit_1(3)$, $bit_2(3)$]=[0,1]
[$bit_1(4)$, $bit_2(4)$]=[0,1]
[$bit_1(5)$, $bit_2(5)$]=[0,1]
[$bit_1(6)$, $bit_2(6)$]=[0,1]
[$bit_1(7)$, $bit_2(7)$]=[1,0]
[$bit_1(8)$, $bit_2(8)$]=[1,0]

Further, in a case where Nt=4 and Nb =2, Np=16, and the Nt-bit switching control signal is given as:

[$bit_1(1)$, $bit_2(1)$, $bit_3(1)$, $bit_4(1)$]=[1,0,0,0]
[$bit_1(2)$, $bit_2(2)$, $bit_3(2)$, $bit_4(2)$]=[1,0,0,0]
[$bit_1(3)$, $bit_2(3)$, $bit_3(3)$, $bit_4(3)$]=[0,1,0,0]
[$bit_1(4)$, $bit_2(4)$, $bit_3(4)$, $bit_4(4)$]=[0,1,0,0]
[$bit_1(5)$, $bit_2(5)$, $bit_3(5)$, $bit_4(5)$]=[0,0,1,0]
[$bit_1(6)$, $bit_2(6)$, $bit_3(6)$, $bit_4(6)$]=[0,0,1,0]
[$bit_1(7)$, $bit_2(7)$, $bit_3(7)$, $bit_4(7)$]=[0,0,0,1]
[$bit_1(8)$, $bit_2(8)$, $bit_3(8)$, $bit_4(8)$]=[0,0,0,1]
[$bit_1(9)$, $bit_2(9)$, $bit_3(9)$, $bit_4(9)$]=[0,0,0,1]
[$bit_1(10)$, $bit_2(10)$, $bit_3(10)$, $bit_4(10)$]=[0,0,0,1]
[$bit_1(11)$, $bit_2(11)$, $bit_3(11)$, $bit_4(11)$]=[0,0,1,0]
[$bit_1(12)$, $bit_2(12)$, $bit_3(12)$, $bit_4(12)$]=[0,0,1,0]
[$bit_1(13)$, $bit_2(13)$, $bit_3(13)$, $bit_4(13)$]=[0,1,0,0]
[$bit_1(14)$, $bit_2(14)$, $bit_3(14)$, $bit_4(14)$]=[0,1,0,0]
[$bit_1(15)$, $bit_2(15)$, $bit_3(15)$, $bit_4(15)$]=[1,0,0,0]
[$bit_1(16)$, $bit_2(16)$, $bit_3(16)$, $bit_4(16)$]=[1,0,0,0]

In this way, the output switcher 211 switches among the Nt adders 212 every Nb radar transmission periods Tr to select an adder 212 that performs an addition process excluding addition of no-signal inputs from the output switcher 211. Further, the output switcher 211 selects each of the adders 212 (Nb×2) times every antenna switching period (Np×Tr).

The Nt adders 212 perform addition (coherent integration) of correlation calculation values $AC_z(k, M)$, which are outputted from the correlation calculator 210, over the duration (Tr×Np) of a predetermined number (Np) of radar transmission periods Tr, i.e. over an antenna switching period (Tr×Np), with use of the respective inputs provided from the output switcher 211 after the control of switching. The addition (coherent integration) process that the $N_D$th adder 212 of the zth signal processor 207 performs as many times as the number of additions Np over an antenna switching period (Tr×Np) is expressed by equation below. Note here that z=1, . . . , Na and $N_D$=1, . . . , Nt.

$$CI_z^{(N_D)}(k, m) = \sum_{g=1}^{N_P} bit_{N_D}(g) AC_z(k, N_p(m-1) + g) \quad (11)$$

That is, the $N_D$th adder 212 performs the process of adding those of the correlation calculation values outputted from the correlation calculator 210 which correspond to a first radar transmission period Tr[M] during which $bit_{ND}(M)$=1. Specifically, in the example of an Nt-bit switching control signal [$bit_1(M)$, $bit_2(M)$, . . . , $bit_{Nt}(M)$], each of the adders 212 performs an addition process on outputs from the correlation calculator 210 2×Nb times every antenna switching period.

As described above, the radar transmitter 100 switches among the transmitting antennas 108 every second radar transmission period in accordance with a switching control signal (e.g. [$bit_1(M)$, $bit_2(M)$, . . . , $bit_{Nt}(M)$]) to select a transmitting antenna 108 that transmits a radar transmission signal.

That is, the radar transmitter 100 switches from transmitting a radar transmission signal through the first transmitting antenna 108 to transmitting a radar transmission signal through the Ntth transmitting antenna 108 in order and then switches from transmitting a radar transmission signal through the Ntth transmitting antenna 108 to transmitting a radar transmission signal through the first transmitting antenna 108 in reverse order every plurality of (Nb) radar transmission periods Tr (second radar transmission period (Tr×Nb)). That is, the radar transmitter 100 switches from transmitting a radar transmission signal through one transmitting antenna 108 to transmitting a radar transmission signal through another transmitting antenna 108 in a predetermined order every second radar transmission period (Tr× Nb) in one antenna switching period.

This causes a radar transmission signal to be transmitted Nb×2 times (an even number of times) from each of the transmitting antennas 108 every antenna switching period (Np×Tr). Further, the Nb×2 timings of transmission of a radar transmission signal from each of the transmitting antennas 108 are symmetrical with respect to a phase reference that is a timing of (Np−1)Tr/2. That is, a radar transmission signal is transmitted Nb times from each of the transmitting antennas 108 symmetrically before and after the phase reference ((Np−1)Tr/2). That is, the two timings of transmission from each of the transmitting antennas 108 which have a symmetric relation with respect to the phase reference are identical in time difference (transmission time difference) from the phase reference.

With this, a correlation additional value that the radar receiver 200 obtained by adding 2×Nb received signals corresponding to one of the transmitting antennas 108 and a correlation additional value that the radar receiver 200 obtained by adding 2×Nb received signals corresponding to another one of the transmitting antennas 108 come into phase with each other at the phase reference and therefore become identical in phase to each other. This allows the radar receiver 200 to, even if a reflected wave includes a Doppler frequency shift, perform an addition process to absorb a change in phase by the Doppler frequency shift due to differences in timing of switching among the transmitting antennas 108 in the received signals.

Therefore, in Embodiment 2, as in Embodiment 1, the radar receiver 200 does not need to perform a phase correction process on a phase difference that is generated due to the timings of switching among the transmission antennas 108, i.e. a phase correction process for transmitting transmit pulses at the same timing. Therefore, Embodiment 2 makes it unnecessary for the radar apparatus 10 (time-division multiplexing MIMO radar) to perform a phase correction process in consideration of the timings of switching among the transmitting antennas 108 and makes it possible for the radar apparatus 10 to reduce the amount of calculation.

Further, in Embodiment 2, the radar apparatus 10 continuously transmits radar transmission signals through the same transmitting antenna 108 for the duration of a plurality of (Nb) first radar transmission periods (second radar transmission period).

For example, in a case where complementary codes (e.g. Golay codes) are used as pulse codes that are generated from the code generator 102, the radar apparatus 10 needs only set a multiple of 2 as the value of Nb. This allows the radar apparatus 10 to maintain the low side lobe characteristics of the complementary codes to be transmitted and reduce the amount of calculation.

For example, in the case of complementary codes (e.g. a Golay code sequence), the code generator 102 generates codes Pn and Qn that alternately form a complementary pair every first radar transmission period. That is, the radar apparatus 10 transmits the code Pn as the pulse-compression code $a_n(M)$ in the Mth first radar transmission period Tr[M] and transmits the code Qn as a pulse-compression code $a_n(M+1)$ in the following (M+1)th radar transmission period Tr[M+1]. In the following radar transmission periods (Tr [M+2] and later), the radar apparatus 10 performs similar code transmissions in sequence every two first radar transmission periods.

Further, a Spano code is designed to be a code having a line of codes by which a change in phase due to a Doppler frequency shift is reduced every four or eight code transmission periods. For this reason, in a case where Spano codes are used as codes that are generated from the code generator 102, the radar apparatus 10 needs only set a multiple of 4 or 8 as the value of Nb. This allows the radar apparatus 10 to, even in a case where a Doppler frequency shift is included in a received signal reflected from a moving target, maintain the low side lobe characteristic of the Spano code to be transmitted and reduce the amount of calculation.

A Spano code of a code length L is constituted using 2L code sequences. For this reason, in a case where the radar apparatus 10 transmits $N_L$ different code sequences, the code generator 102 sequentially transmits different code sequences every first radar transmission period. That is, the radar apparatus 10 transmits the first code as the pulse-compression code $a_n(M)$ in the Mth first radar transmission period Tr[M], transmits the second code as the pulse-compression code $a_n(M+1)$ in the following (M+1)th radar transmission period Tr[M+1], and then transmits up to the $N_L$th code until the (M+2L)th first radar transmission period Tr. Furthermore, the radar apparatus 10 performs similar $N_L$ code transmissions in sequence every $N_L$ first radar transmission periods Tr.

Further, the code generator 102 may transmit different Spano codes in sequence for each separate transmitting antenna 108.

It should be noted that in a case where complementary codes or Spano codes are used as pulse codes in a MIMO radar, it may be difficult, depending on a method for switching among transmitting antennas, to sufficiently suppress side lobes even by using the complementary codes or the Spano codes. On the other hand, the radar apparatus 10 may switch from transmitting a radar transmission signal through one transmitting antenna 108 to transmitting a radar transmission signal through another transmitting antenna 108 every plurality of first radar transmission periods. That is, the radar apparatus 10 may switch from transmitting a radar transmission signal through the first transmitting antenna 108 to transmitting a radar transmission signal through the Ntth transmitting antenna 108 in order every Nb first radar transmission periods. In other words, the radar apparatus 10 transmits a radar transmission signal Nb consecutive times through each of the transmitting antennas 108. This allows the radar apparatus 10 to maintain the low side lobe characteristics of complementary codes and Spano codes even in a case where complementary codes or Spano codes are used as pulse codes, as code sequences constituting complementary codes or Spano codes can be continuously transmitted. This allows even a MIMO radar to sufficiently suppress side lobes.

Embodiment 3

A radar apparatus according to Embodiment 3 is described with continued reference to FIG. 1, as it has basic components in common with the radar apparatus 10 according to Embodiment 1.

Embodiment 3 describes a case where the switching controller 105 performs the switching control of periodically switching among the transmitting antennas 108.

Figure 10:
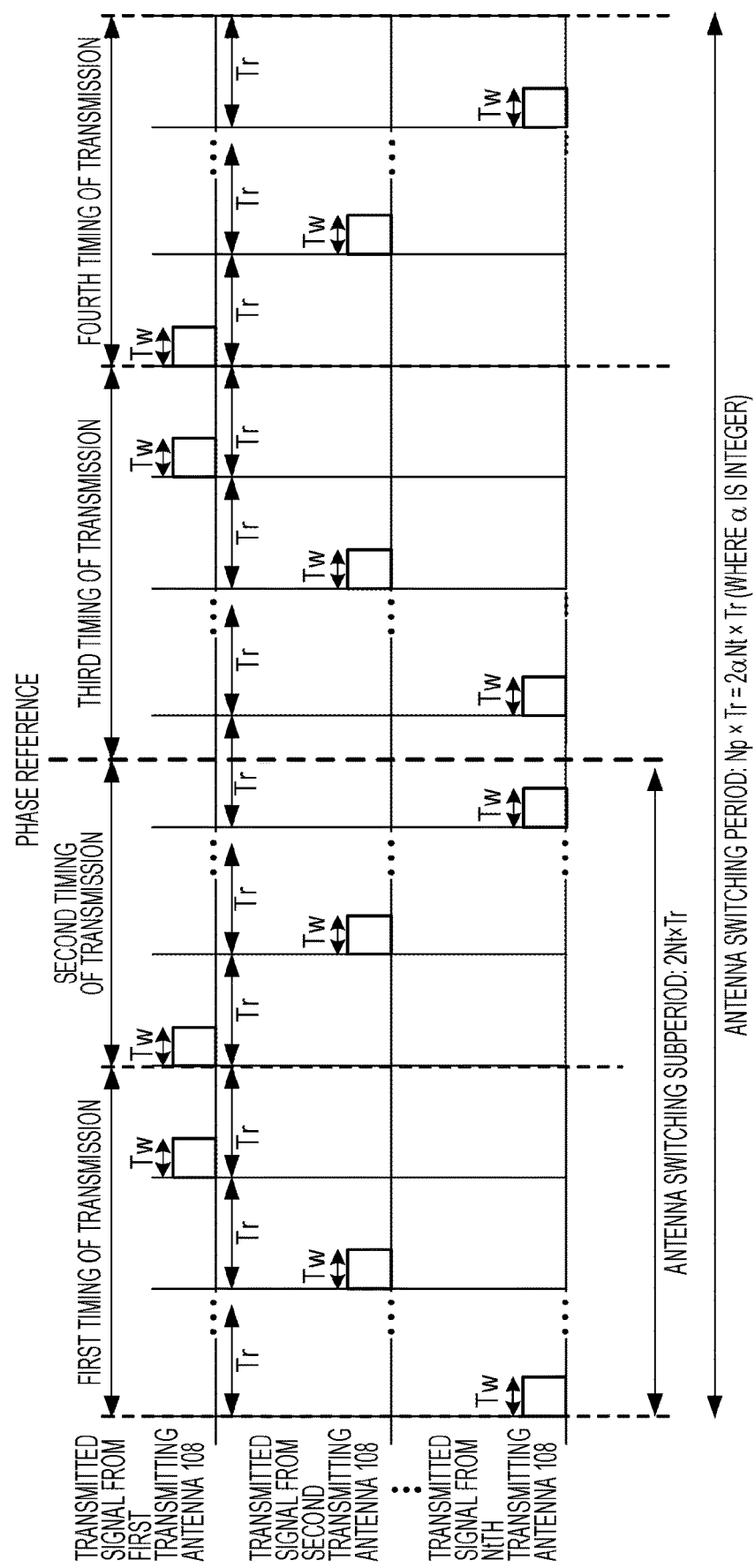
FIG. 10 shows an example of an operation of switching among transmitting antennas according to Embodiment 3 of the present disclosure.

FIG. 10 shows an example of an operation of switching among the transmitting antennas 108 according to Embodiment 3.

In FIG. 10, the switching controller 105 transmits, to the transmission switcher 106, a switching control signal indicating an instruction to switch from the Ntth transmitting antenna 108 to the first transmitting antenna 108 in order and then switch from the first transmitting antenna 108 to the Ntth transmitting antenna 108 in reverse order every first radar transmission period Tr. Then, the switching controller 105 similarly transmits, to the transmission switcher 106, a switching control signal indicating an instruction to switch from the Ntth transmitting antenna 108 to the first transmitting antenna 108 in order and then switch from the first transmitting antenna 108 to the Ntth transmitting antenna 108 in reverse order every first radar transmission period Tr.

That is, the switching controller 105 repeats the operation of switching from the Ntth to first transmitting antennas 108 and from the first to Ntth transmitting antennas 108 every antenna switching subperiod (2Nt×Tr) αtimes in an antenna switching period (Np×Tr) (Note, however, that a is an integer. In FIG. 10, α=2). That is, Np=2αNt here. It should be noted that a may be a value of not less than 3.

In accordance with the instructions indicated by the switching control signals, the transmission switcher 106 switches from the Ntth radio transmitter 107 to the first radio transmitter 107 in order and then switches from the first radio transmitter 107 to the Ntth radio transmitter 107 in order every first radar transmission period Tr. Further, the transmission switcher 106 repeats the antenna switching subperiod a times. This allows the radar transmitter 100 to transmit a radar transmission signal 2α times through each of the transmitting antennas 108 every antenna switching period (Np×Tr).

Further, the output switcher 211 of each of the antenna system processors 201 selects one of the Nt adders 212 in accordance with a switching control signal outputted from the switching controller 105 and outputs, to the adder 212 thus selected, an output produced by the correlation calculator 210 every first radar transmission period Tr. Meanwhile, those adders 212 which were not selected by the output switcher 211 are brought into a no-signal state where the adders 212 receive no signals including signal components. In the following, a switching control signal in the Mth first radar transmission period Tr[M] is expressed as Nt bits [bit$_1$(M), bit$_2$(M), . . . , bit$_{Nt}$(M)]. Note here that, in the Mth first radar transmission period Tr[M], the output switcher 211 selects the N$_D$th adder 212 in a case where the N$_D$th bit bit$_{ND}$(M) is 1 and does not select the N$_D$th adder 212 in a case where the N$_D$th bit bit$_{ND}$(M) is 0. It should be noted that the phrase "every first radar transmission period Tr" above may be read as "every second radar transmission period (Tr×Nb)".

For example, in a case where Nt=2 and α=2, Np=8, and the Nt-bit switching control signal is given as:
[bit$_1$(1), bit$_2$(1)]=[0,1]
[bit$_1$(2), bit$_2$(2)]=[1,0]
[bit$_1$(3), bit$_2$(3)]=[1,0]
[bit$_1$(4), bit$_2$(4)]=[0,1]
[bit$_1$(5), bit$_2$(5)]=[0,1]
[bit$_1$(6), bit$_2$(6)]=[1,0]
[bit$_1$(7), bit$_2$(7)]=[1,0]
[bit$_1$(8), bit$_2$(8)]=[0,1]

Further, in a case where Nt=4 and α=2, Np=16, and the Nt-bit switching control signal is given as:
[bit$_1$(1), bit$_2$(1), bit$_3$(1), bit$_4$(1)]=[0,0,0,1]
[bit$_1$(2), bit$_2$(2), bit$_3$(2), bit$_4$(2)]=[0,0,1,0]
[bit$_1$(3), bit$_2$(3), bit$_3$(3), bit$_4$(3)]=[0,1,0,0]
[bit$_1$(4), bit$_2$(4), bit$_3$(4), bit$_4$(4)]=[1,0,0,0]
[bit$_1$(5), bit$_2$(5), bit$_3$(5), bit$_4$(5)]=[1,0,0,0]
[bit$_1$(6), bit$_2$(6), bit$_3$(6), bit$_4$(6)]=[0,1,0,0]
[bit$_1$(7), bit$_2$(7), bit$_3$(7), bit$_4$(7)]=[0,0,1,0]
[bit$_1$(8), bit$_2$(8), bit$_3$(8), bit$_4$(8)]=[0,0,0,1]
[bit$_1$(9), bit$_2$(9), bit$_3$(9), bit$_4$(9)]=[0,0,0,1]
[bit$_1$(10), bit$_2$(10), bit$_3$(10), bit$_4$(10)]=[0,0,1,0]
[bit$_1$(11), bit$_2$(11), bit$_3$(11), bit$_4$(11)]=[0,1,0,0]
[bit$_1$(12), bit$_2$(12), bit$_3$(12), bit$_4$(12)]=[1,0,0,0]
[bit$_1$(13), bit$_2$(13), bit$_3$(13), bit$_4$(13)]=[1,0,0,0]
[bit$_1$(14), bit$_2$(14), bit$_3$(14), bit$_4$(14)]=[0,1,0,0]
[bit$_1$(15), bit$_2$(15), bit$_3$(15), bit$_4$(15)]=[0,0,1,0]
[bit$_1$(16), bit$_2$(16), bit$_3$(16), bit$_4$(16)]=[0,0,0,1]

In this way, the output switcher 211 switches among the Nt adders 212 every first radar transmission period Tr to select an adder 212 that performs an addition process excluding addition of no-signal inputs from the output switcher 211. Further, the output switcher 211 selects each of the adders 212 2α times every antenna switching period (Np×Tr).

The Nt adders 212 perform addition (coherent integration) of correlation calculation values AC$_z$(k, M), which are outputted from the correlation calculator 210, over the duration (Tr×Np) of a predetermined number (Np) of first radar transmission periods Tr, i.e. over an antenna switching period (Tr×Np), with use of the respective inputs provided from the output switcher 211 after the control of switching. The addition (coherent integration) process that the N$_D$th adder 212 of the zth signal processor 207 performs as many times as the number of additions Np over an antenna switching period (Tr×Np) is expressed by equation below. Note here that z=1, . . . , Na and N$_D$=1, . . . , Nt.

$$CI_z^{(ND)}(k, m) = \sum_{g=1}^{N_P} \text{bit}_{N_D}(g) AC_z(k, N_p(m-1) + g) \quad (12)$$

That is, the N$_D$th adder 212 performs the process of adding those of the correlation calculation values outputted from the correlation calculator 210 which correspond to a radar transmission period Tr[M] during which bit$_{ND}$(M)=1. Specifically, in the example of an Nt-bit switching control signal [bit$_{ND}$(M), bit$_2$(M), . . . , bit$_{Nt}$(M)], each of the adders 212 performs an addition process on outputs from the correlation calculator 210 2α times (in FIG. 10, four times) every antenna switching period.

As described above, the radar transmitter 100 switches among the transmitting antennas 108 every antenna switching period in accordance with a switching control signal (e.g. [bit$_1$(M), bit$_2$(M), . . . , bit$_{Nt}$(M)]) to select a transmitting antenna 108 that transmits a radar transmission signal.

That is, the radar transmitter 100 repeats α times an antenna switching subperiod during which to switch from transmitting a radar transmission signal through the first transmitting antenna 108 to transmitting a radar transmission signal through the Ntth transmitting antenna 108 in order and then switch from transmitting a radar transmission signal through the Ntth transmitting antenna 108 to transmitting a radar transmission signal through the first transmitting antenna 108 in reverse order every first radar transmission period Tr.

This causes a radar transmission signal to be transmitted 2α times (an even number of times) from each of the transmitting antennas 108 every antenna switching period (Np×Tr). Further, the 2α timings of transmission of a radar transmission signal from each of the transmitting antennas 108 are symmetrical with respect to a phase reference that is a timing of (Np−1)Tr/2. That is, a radar transmission signal is transmitted a times from each of the transmitting antennas 108 symmetrically before and after the phase reference ((Np−1)Tr/2). That is, the two timings of transmission from each of the transmitting antennas 108 which have a symmetric relation with respect to the phase reference are identical in time difference (transmission time difference) from the phase reference.

With this, a correlation additional value that the radar receiver 200 obtained by adding 2×Nb received signals corresponding to one of the transmitting antennas 108 and of a correlation additional value that the radar receiver 200 obtained by adding 2×Nb received signals corresponding to another one of the transmitting antennas 108 come into phase with each other at the phase reference and therefore become identical in phase to each other. This allows the radar receiver 200 to, even if a reflected wave includes a Doppler frequency shift, perform an addition process to absorb a change in phase by the Doppler frequency shift due to differences in timing of switching among the transmitting antennas 108 in the received signals.

Therefore, in Embodiment 3, as in Embodiment 1, the radar receiver 200 does not need to perform a phase correction process on a phase difference that is generated due to the timings of switching among the transmission antennas 108, i.e. a phase correction process for transmitting transmit pulses at the same timing. Therefore, Embodiment 3 makes it unnecessary for the radar apparatus 10 (time-division multiplexing MIMO radar) to perform a phase correction process in consideration of the timings of switching among the transmitting antennas 108 and makes it possible for the radar apparatus 10 to reduce the amount of calculation.

Further, the $2\alpha$ ($=4$) timings of transmission from each of the transmitting antennas 108 as shown in FIG. 10 are averaged among the transmitting antennas 108.

For example, let attention be paid to the second timing of transmission from each of the transmitting antennas 108 which precedes the phase reference (see FIG. 10). In the first timing of transmission, the transmission time difference from the phase reference becomes larger in the order of the Ntth to first transmitting antennas 108. On the other hand, in the second timing of transmission, the transmission time difference from the phase reference becomes smaller in the order of the Ntth to first transmitting antennas 108.

Similarly, let attention be paid to the third timing of transmission from each of the transmitting antennas 108 which follows the phase reference (see FIG. 10). In the second timing of transmission, the transmission time difference from the phase reference becomes smaller in the order of the Ntth to first transmitting antennas 108. On the other hand, in the fourth timing of transmission, the transmission time difference from the phase reference becomes larger in the order of the Ntth to first transmitting antennas 108.

That is, in FIG. 10, the transmitting antennas 108 are about equal in terms of the average of transmission time differences between timings of transmission and the phase reference. Thus, in Embodiment 3, the radar apparatus 10 (switching controller 105) switches among the plurality of transmitting antennas 108 so that the sum of transmission time differences between $2\alpha$ (an even number of) timings of transmission of a radar transmission signal and the phase reference is averaged out among the plurality of transmitting antennas 108.

Shifts in amplitude value occurs due to the timings of switching among the transmitting antennas 108. Specifically, a larger time difference in timing of switching leads to a larger shift in amplitude value. On the other hand, in Embodiment 3, the time difference between timings of transmission from each of the transmitting antennas 108 is averaged out among the transmitting antennas 108, so that the shifts in amplitude value due to the timings of switching among the transmitting antennas 108 are also averaged out. Therefore, Embodiment 3 makes it possible to further reduce the deviation in amplitude value of results of addition for each of the transmitting antennas 108, allowing the radar apparatus 10 to improve in accuracy of direction estimation.

The foregoing has described embodiments according to aspects of the present disclosure.

It should be noted that a proper combination of operations according to the embodiments and their respective variations may be implemented.

Other Embodiments (1) The antenna numbers 1 to Nt assigned to the Nt transmitting antennas 108 are used to distinguish one transmitting antenna 108 from another and not intended to indicate a positional relationship between physical antenna locations. The orders of switching among the transmitting antennas 108 as shown in FIGS. 3, 6, 9, and 10 are intended for illustrative purposes, not for limitative purposes.

Further, in the embodiments described above, the parameters used for switching among the transmitting antennas 108 are intended for illustrative purposes, not for limitative purposes.

(2) In each of the embodiments, the radar apparatus 10 may correct an amplitude difference in reception between transmitting antennas 108 caused by fast Doppler. This brings about further improvement in accuracy of direction-of-arrival estimation.

For example, an amplitude correction needs performing real-number multiplication (Nt−1)×(Na)×(Nbin) times, where Nbin is the number of Doppler frequency bins, Nt is the number of transmitting antennas 108, and Na is the number of receiving antennas 202. For example, in a case where the number of frequency bins Nb is 512, the number of transmitting antennas Nt is 2, and the number of receiving antennas Na is 4, the radar apparatus 10 needs to perform real-number multiplication a total of 2048 times ($=1\times4\times512$). However, an ordinary radar apparatus needs to perform real-number multiplication the same number of times (2048 times in the case of the example described above) for a phase correction in addition to an amplitude correction (2048 times). Therefore, the embodiments described above bring about such an effect that the amount of calculation (2048 times of amplitude correction) in the radar apparatus 10 is smaller by ½ than that (a total of 4096 times of amplitude correction and phase correction) of the ordinary radar apparatus.

Figure 8:
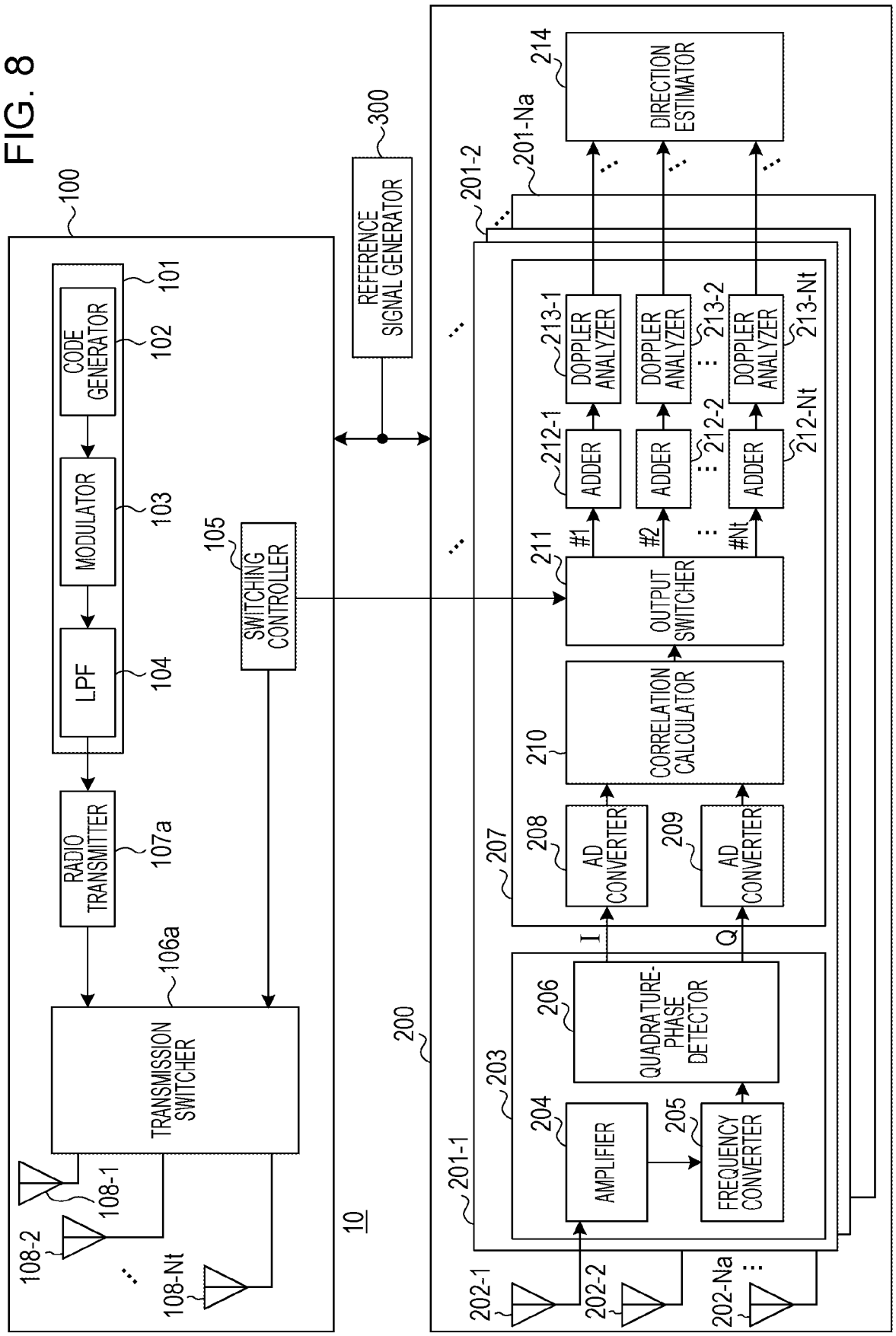
FIG. 8 shows another configuration of a radar apparatus according to Embodiment 1 of the present disclosure.

(3) In each of the radar apparatuses 10 shown in FIGS. 1 and 8, respectively, the radar transmitter 100 and the radar receiver 200 may be individually placed in physically separated places.

(4) Although not illustrated, the radar apparatus 10 includes a storage medium such as a ROM (read-only memory) storing a control program and a work memory such as a RAM (random-access memory). In this case, the functions of the components described above are achieved by a CPU executing the control program. Note, however, that the radar apparatus 10 is not limited in hardware configuration to such an example. For example, the functional components of the radar apparatus 10 may be achieved as ICs (integrated circuits). These functional components may take the form of individual single chips or of a single chip including some or all of them.

In the foregoing, various embodiments have been described with reference to the drawings. However, the present disclosure is of course not limited to such examples. It is apparent that persons skilled in the art can conceive of various changes and alterations within the scope of claims, and such changes and alterations are naturally understood as pertaining to the technical scope of the present disclosure. Each constituent element in the embodiment described above may be arbitrarily combined with the other without departing from the spirit of the disclosure.

Although each of the embodiments described above has been described by giving an example where the present disclosure is configured with hardware, the present disclosure may alternatively be achieved with software in cooperation with hardware.

Further, the functional blocks used in the description of each of the embodiments above are typically achieved as LSIs, i.e. integrated circuits each having an input terminal and an output terminal. The integrated circuits may control the functional blocks used in the description of the embodiments above and each include an input terminal and an output terminal. These LSIs may take the form of individual single chips or of a single chip including some or all of them. Depending on the degree of integration, the LSIs may alternatively be referred to as "ICs (integrated circuits)", "system LSIs", "super LSIs", or "ultra LSIs".

Further, the method for integrating circuits is not limited to LSI, but may be achieved with dedicated circuits or general-purpose processors. An FPGA (field programmable gate array) that can be programmed after manufacturing of an LSI or a reconfigurable processor that allows reconfiguration of the connection or setup of circuit cells inside the LSI may be utilized.

Furthermore, if an advance in semiconductor technology or a derivative technology gives rise to an integrated-circuit technology that replaces LSI, the technology may of course be employed to integrate the functional blocks. Possibilities include the application of biotechnology and the like.

Summary of the Present Disclosure

A radar apparatus of the present disclosure includes: a radar signal generator, which in operation, outputs a plurality of radar signals; a switching controller, which in operation, allocates each of a plurality of transmitting antennas an even number of times in sequence in a determined order to every one or more radar signal transmission periods within a determined period; and a radio transmitter, which in operation, transmits each of the plurality of radar signals every one of the radar signal transmission periods through the allocated transmitting antenna. In the radar apparatus of the present disclosure, one or more pairs of an even number of transmission start timings at which the allocated transmitting antennas transmit each of the plurality of radar signals within the determined period have identical time differences from a reference timing within the determined period.

In the radar apparatus of the present disclosure, in a case where the radar signals are generated using complementary codes, the switching controller switches among the plurality of transmitting antennas every even number of the radar signal transmission periods, the plurality being an even number.

In the radar apparatus of the present disclosure, in a case where the radar signals are generated using Spano codes, the switching controller switches among the plurality of transmitting antenna every 4 or 8 multiples of the radar signal transmission periods.

In the radar apparatus of the present disclosure, a first average of time differences between each of a plurality of transmission start timings of transmission from a first transmitting antenna among the plurality of transmitting antennas and the reference timing and a second average of time differences between each of a plurality of transmission start timings from t a second transmitting antenna among the plurality of transmitting antennas and the reference timing are equal.

In the radar apparatus of the present disclosure, the switching controller switches among the plurality of transmitting antennas from a first transmitting antenna to an Nt-th transmitting antenna in order and then from the Ntth transmitting antennas to the first transmitting antenna in reverse order every one of the radar signal transmission periods, Nt being an integer of not less than 2.

In the radar apparatus of the present disclosure, the switching controller switches among the plurality of transmitting antennas from a first transmitting antenna to an Nt-th transmitting antenna in order and then from the Ntth transmitting antennas to the first transmitting antenna in reverse order every Nb of the radar signal transmission periods, Nt being an integer of not less than 2, and Nb being an integer of not less than 2.

In the radar apparatus of the present disclosure, the switching controller repeats an operation of switching among the plurality of transmitting antennas from an Nt-th transmitting antenna to a first transmitting antenna in order and then from the first transmitting antennas to the Ntth transmitting antenna in reverse order every one of the radar signal transmission periods, the operation being repeated a plurality of times within the determined period, Nt being an integer of not less than 2.

A radar method of the present disclosure includes: outputting a plurality of radar signals; allocating each of a plurality of transmitting antennas an even number of times in sequence in a determined order every one or more radar signal transmission periods within a determined period; and transmitting each of the plurality of radar signals every one of the radar signal transmission periods through the allocated transmitting antenna, wherein one or more pairs of an even number of transmission start timings at which the allocated transmitting antennas transmit each of the plurality of radar signals within the determined period have identical time differences from a reference timing within the determined period.

The present disclosure is suitable as a radar apparatus that performs detection in a wide angular range.

What is claimed is:

1. A radar apparatus comprising:
    a radar signal generator, which in operation, outputs 2*Nt radar signals, Nt being an integer that is greater than 1;
    a switching controller, which in operation, allocates two of the 2*Nt radar signals to each of first to Nt-th transmitting antennas in first to (2*Nt)-th non-overlapping radar signal transmission periods; and
    a radio transmitter, which in operation, transmits one of the 2*Nt radar signals from one of the first to Nt-th transmitting antennas in each of the first to (2*Nt)-th non-overlapping radar signal transmission periods,
    wherein the radio transmitter transmits the two radar signals allocated to the first transmitting antenna in the first and 2*Nt-th non-overlapping radar signal transmission periods, respectively, through the first transmitting antenna, and
    wherein the radio transmitter transmits the two radar signals allocated to the Nt-th transmitting antenna in the Nt-th and (Nt+1)-th non-overlapping radar signal transmission periods, respectively, through the Nt-th transmitting antenna.

2. The radar apparatus according to claim 1, wherein the radar signal generator generates the 2*Nt radar signals using complementary codes.

3. The radar apparatus according to claim 1, wherein the radar signal generator generates the 2*Nt radar signals using Spano codes.

4. The radar apparatus according to claim 1, wherein each of the first to (2*Nt)-th non-overlapping radar signal transmission periods has a same length.

5. The radar apparatus according to claim 1, wherein Nt is greater than 2.

6. A radar method comprising:

outputting 2*Nt radar signals, Nt being an integer that is greater than 1;

allocating two of the 2*Nt radar signals to each of first to Nt-th transmitting antennas in first to (2Nt)-th non-overlapping radar signal transmission periods; and transmitting one of the 2*Nt radar signals from one of the first to Nt-th transmitting antennas in each of the first to (2*Nt)-th radar non-overlapping signal transmission periods, wherein the two radar signals allocated to the first transmitting antenna are transmitted in the first and 2*Nt-th non-overlapping radar signal transmission periods, respectively, through the first transmitting antenna, and wherein the two radar signals allocated to the Nt-th transmitting antenna are transmitted in the Nt-th and (Nt+1)-th non-overlapping radar signal transmission periods, respectively, through the Nt-th transmitting antenna.

7. The radar method according to claim 6, comprising generating the 2*Nt radar signals using complementary codes.

8. The radar method according to claim 6, comprising generating the 2*Nt radar signals using Spano codes.

9. The radar method according to claim 6, wherein each of the first to (2*Nt)-th non-overlapping radar signal transmission periods has a same length.

10. The radar method according to claim 6, wherein Nt is greater than 2.

* * * * *